(12) United States Patent
Wolfram et al.

(10) Patent No.: US 9,262,070 B2
(45) Date of Patent: Feb. 16, 2016

(54) POSITIONING PADS FOR MOVING A POSITION OF INTEREST ON A DISPLAY

(71) Applicant: WOLFRAM RESEARCH, INC., Champaign, IL (US)

(72) Inventors: Stephen Wolfram, Concord, MA (US); John Fultz, Chesterfield, MO (US)

(73) Assignee: WOLFRAM RESEARCH, INC., Champaign, IL (US)

( * ) Notice: Subject to any disclaimer, the term of this patent is extended or adjusted under 35 U.S.C. 154(b) by 138 days.

(21) Appl. No.: 14/216,498

(22) Filed: Mar. 17, 2014

(65) Prior Publication Data

US 2014/0282158 A1 Sep. 18, 2014

Related U.S. Application Data

(60) Provisional application No. 61/788,994, filed on Mar. 15, 2013.

(51) Int. Cl.
*G06F 3/048* (2013.01)
*G06F 3/0488* (2013.01)
*G06F 3/0484* (2013.01)

(52) U.S. Cl.
CPC .......... *G06F 3/0488* (2013.01); *G06F 3/04842* (2013.01)

(58) Field of Classification Search
CPC ... G06F 3/0481; G06F 9/4443; G06F 3/0488; G06F 3/016
USPC ................... 715/767, 780; 708/168; 434/188; 345/173
See application file for complete search history.

(56) References Cited

U.S. PATENT DOCUMENTS

| | | | |
|---|---|---|---|
| 5,251,292 A | 10/1993 | Martel, Jr. et al. | |
| 6,108,617 A | 8/2000 | Schomer | |
| 6,219,822 B1 | 4/2001 | Gristede et al. | |
| 6,252,597 B1 | 6/2001 | Lokuge | |
| 6,359,572 B1 | 3/2002 | Vale | |
| 6,610,106 B1 * | 8/2003 | Jenks | G06F 17/215 708/142 |
| 6,934,910 B2 | 8/2005 | Lange | |
| 7,447,360 B2 | 11/2008 | Li et al. | |
| 7,451,389 B2 | 11/2008 | Huynh et al. | |
| 7,466,958 B2 | 12/2008 | Dunk et al. | |
| 7,561,737 B2 | 7/2009 | Zou et al. | |
| 7,561,738 B2 | 7/2009 | Zou et al. | |
| 7,561,739 B2 | 7/2009 | Xu et al. | |
| 7,929,767 B2 | 4/2011 | Xu et al. | |
| 8,131,516 B2 | 3/2012 | Hindman et al. | |
| 8,225,269 B2 | 7/2012 | Balaram et al. | |
| 8,510,650 B2 | 8/2013 | Garland et al. | |
| 8,589,869 B2 | 11/2013 | Wolfram | |
| 8,706,022 B2 | 4/2014 | Dunk et al. | |
| 8,788,548 B2 | 7/2014 | Hatch | |
| 8,887,083 B2 | 11/2014 | Toyooka et al. | |
| 8,887,136 B2 | 11/2014 | Delbaere et al. | |
| 8,966,439 B2 | 2/2015 | Wolfram | |

(Continued)

*Primary Examiner* — Haoshian Shih

(57) ABSTRACT

Positioning pads are displayed via a display device to facilitate movement of a position of interest (e.g., as indicated by a cursor) with respect to a structured object also displayed via the display device. The structured object is analyzed to determine predicted locations to which a user may subsequently wish to navigate the position of interest, and positioning pads are displayed at, or associated with, the predicted locations. When activation of a positioning pad is detected, (i) the position of interest is moved to the location of, or associated with, the positioning pad, and (ii) the positioning pad is no longer displayed via the display device.

25 Claims, 11 Drawing Sheets

(56) References Cited

U.S. PATENT DOCUMENTS

| | | |
|---|---|---|
| 9,025,909 B2 | 5/2015 | Refstrup et al. |
| 2002/0022928 A1 | 2/2002 | Ell |
| 2002/0022929 A1 | 2/2002 | Ell |
| 2002/0035431 A1 | 3/2002 | Ell |
| 2002/0040300 A1 | 4/2002 | Ell |
| 2003/0192008 A1 | 10/2003 | Lee |
| 2003/0208319 A1 | 11/2003 | Ell et al. |
| 2004/0114258 A1* | 6/2004 | Harris, III ............... G06F 17/24 359/841 |
| 2006/0062470 A1 | 3/2006 | Zhu et al. |
| 2008/0077854 A1 | 3/2008 | Alabi |
| 2008/0104153 A1 | 5/2008 | Hatch |
| 2008/0276194 A1 | 11/2008 | Dykstra-Erickson et al. |
| 2011/0116769 A1 | 5/2011 | Sugiyama et al. |
| 2012/0107779 A1* | 5/2012 | Halton ............... G06F 17/215 434/188 |
| 2014/0111522 A1 | 4/2014 | Refstrup et al. |
| 2014/0115452 A1 | 4/2014 | Rudolph et al. |
| 2014/0278294 A1 | 9/2014 | Yeager et al. |
| 2015/0012576 A1 | 1/2015 | Hatch |
| 2015/0169769 A1 | 6/2015 | Wolfram |

* cited by examiner

324b

POSITIONING PADS FOR MOVING A POSITION OF INTEREST ON A DISPLAY

CROSS-REFERENCE TO RELATED APPLICATION

This application claims the benefit of U.S. Provisional Patent Application No. 61/788,994, entitled "Positioning Pads for Moving a Position of Interest on a Display," filed on Mar. 15, 2013, which is incorporated by reference herein in its entirety.

FIELD OF THE DISCLOSURE

The present disclosure relates generally to cursors (or other indicators of a position of interest) on computer display devices and, more particularly, to user movement of a cursor (or a position of interest) on a display.

BACKGROUND

There has recently been a large increase in the number of users who use touch screen based devices as a secondary or even primary computing device. However, certain computer paradigms which were designed for user input via keyboard and mouse are still being used in a primarily touch screen based interface. For example, software operating systems which primarily utilize a touch input still use a "cursor" to display a position of interest in a text input box. However, use of a human finger (or stylus) to select a position on a touch screen is not as accurate as a mouse—while a mouse can be used to select a position of interest on a pixel-by-pixel basis, human digits are too large to make similarly granular selections—especially when the screen size is relatively small (such as on a tablet computer or a smart phone). Furthermore, capacitive screen hardware predominantly used in modern touch-based devices is of varying quality, with high-quality screens providing better accuracy than their lower-quality counterparts. Thus, the inherent clumsiness of human digits and irregular surface capacitivity can create problems when a user is trying to move a position of interest (e.g., move a cursor) to a different location. When a user wants to move the cursor, it may take the user several presses on a touch screen to get the cursor to the desired location, leading to frustration and/or loss of concentration.

This difficulty is especially troublesome when inputting complex mathematical or numerical expressions, such as when using a calculator application, a spreadsheet application, etc. For example, mathematical expressions often utilize a plurality of sets of parentheses or brackets to specify the grouping of terms, to specify the precedence of operations, to set apart the arguments of a function from the function itself, etc. When editing a mathematical expression, it can be difficult to place a cursor at a desired location using a touch screen. For example, when the expression has two adjacent parentheses corresponding to nested parentheses and the user wants to add text between the two parentheses, it can be difficult to use the touch screen to place the cursor between the two parentheses. It may take the user several presses or touch screen operations to move the cursor to the desired location, and thus the user may become frustrated with an application over time.

Additionally, new types of display devices (e.g., 3-dimensional (3D) displays) and user interface devices (e.g., motion detection devices that detect spatial gestures) are becoming more common. Existing techniques for navigating cursors have drawbacks in the context of such new types of display and user interface devices.

SUMMARY OF THE DISCLOSURE

In one embodiment, a method for facilitating movement of a position of interest displayed via a display device includes displaying, via the display device, a structured object having a plurality of levels in a hierarchy and/or in a multi-dimensional coordinate space. The method also includes analyzing, with one or more processors, the structured object to determine one or more predicted locations to which a user may subsequently wish to navigate the position of interest, and positioning pads are displayed at, or associated with, the predicted locations. When activation of a positioning pad is detected, (i) the position of interest is moved to the location of, or associated with, the positioning pad, and (ii) the positioning pad may no longer displayed be via the display device.

In another embodiment, a non-transient, tangible, computer readable storage medium or media has stored thereon machine readable instructions that, when executed by a processor of a computing device, cause the processor to implement the method described above.

In yet another embodiment, a computing device comprises a user input device, and one or more processors. One or more memories and/or computer readable storage devices are coupled to the one or more processors. The one or more memories have stored thereon machine readable instructions that, when executed by the one or more processors, cause the one or more processors to implement the method described above. In another embodiment, the computing device also comprises the display device.

DETAILED DESCRIPTION

Figure 1:
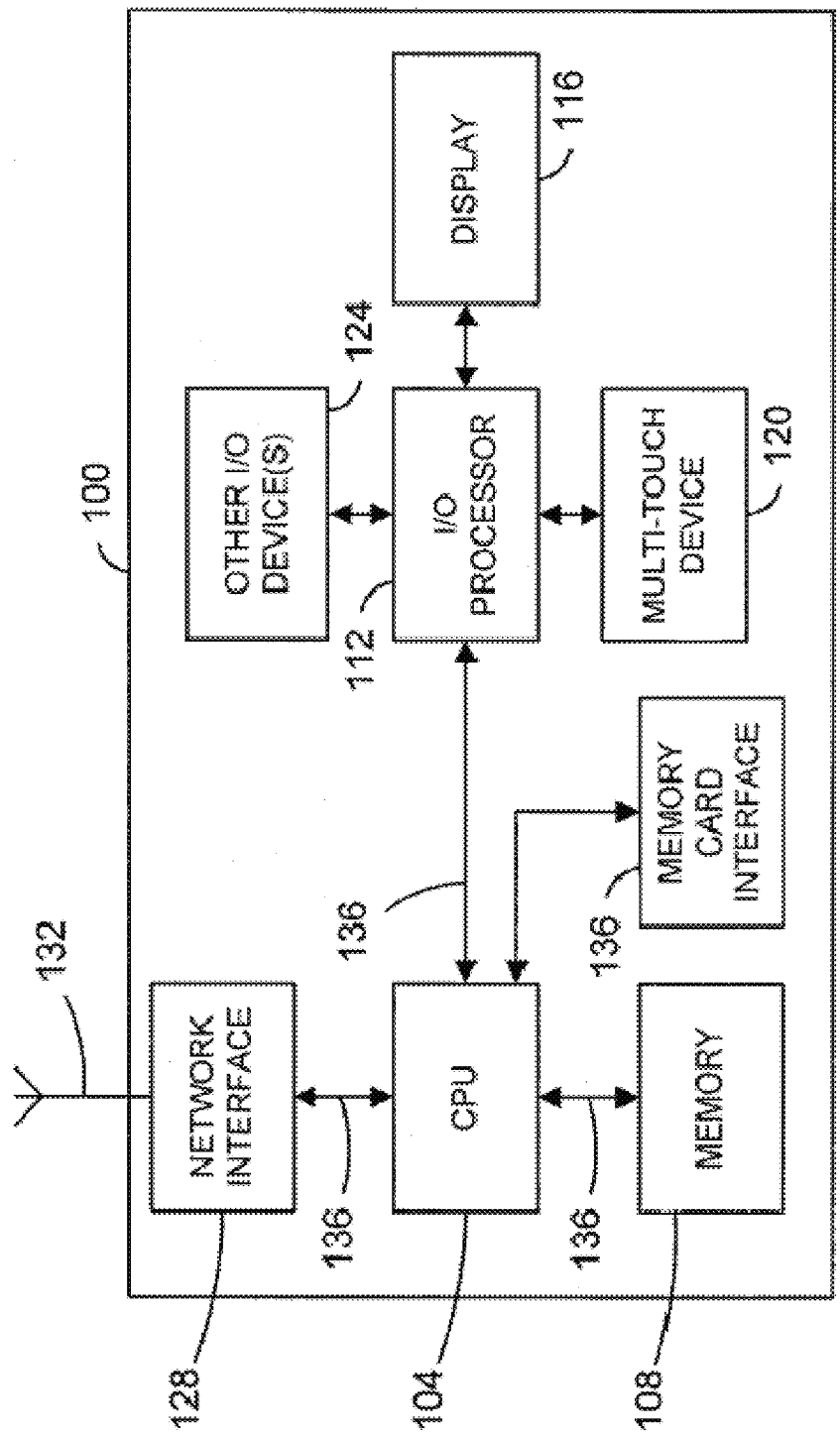
FIG. 1 is a block diagram of an example computing device having a display and a touch screen, the computing device utilizing cursor positioning pads for moving a cursor on the display, according to an embodiment.

FIG. 1 is a block diagram of an example computing device 100 that can used to view and interact with applications having an input field, i.e., an area, displayed on a display screen of the device 100, in which text (e.g., alphanumeric characters) and optionally other information can be input, according to an embodiment. Techniques for enhancing the ability to move a position of interest (e.g., a position of a cursor) to a desired location on a structured object (e.g., a mathematical expression in an input field) quickly and easily are described in the context of the example computing device 100 for explanatory purposes. Similar techniques, however, can be utilized in other types of devices as well. For example, although the device 100 includes a 2-dimensional (2D) display, in other embodiments, a computing device utilizes a suitable display device other than a 2D display. As another example, although the device 100 includes a touch screen, in other embodiments, a computing device utilizes a suitable user input device other than a touch screen.

The device 100 includes a central processing unit (CPU) 104 coupled to a memory 108 (which can include one or more non-transitory, tangible computer readable storage media such as random access memory (RAM), read only memory (ROM), flash memory, a hard disk drive, a digital versatile disk (DVD) disk drive, a Blu-ray disk drive, etc.). The device 100 also includes an input/output (I/O) processor 112 that interfaces the CPU 104 with a display device 116 and a touch-sensitive device (or touch screen) 120. In some embodiments the touch-sensitive device is a multi-touch touch screen, however embodiments of the present application are envisioned for use with devices using various suitable touch screen technologies such as a single-touch touch screen. The I/O processor 112 also interfaces one or more additional I/O devices 124 to the CPU 104, such as one or more buttons, click wheels, a keypad, a touch pad, another touch screen (single-touch or multi-touch), lights, a speaker, a microphone, etc.

A network interface 128 is coupled to the CPU 104 and to an antenna 132. A memory card interface 136 is coupled to the CPU 104. The memory card interface 136 is adapted to receive a memory card such as a secure digital (SD) card, a miniSD card, a microSD card, a Secure Digital High Capacity (SDHC) card, etc., or any suitable card.

The CPU 104, the memory 108, the I/O processor 112, the network interface 128, and the memory card interface 136 are coupled to one or more busses 136. For example, the CPU 104, the memory 108, the I/O processor 112, the network interface 128, and the memory card interface 136 are coupled to a bus 136, in an embodiment. In another embodiment, the CPU 104 and the memory 108 are coupled to a first bus, and the CPU 104, the I/O processor 112, the network interface 128, and the memory card interface 136 are coupled to a second bus. In other embodiments, various other suitable bus architectures are utilized.

The device 100 is only one example of a computing device 100, and other suitable devices can have more or fewer components than shown, can combine two or more components, or a can have a different configuration or arrangement of the components. The various components shown in FIG. 1 can be implemented in hardware, by a processor executing software instructions, or by a combination of both hardware and processor executing software instructions software, including one or more signal processing and/or application specific integrated circuits. Furthermore, the device 100 may be a mobile computing device (such as a mobile phone, tablet, e-reader, etc.), a desktop computer, laptop computer or other computing device. Alternatively, the device 100 may be a single purpose computing device, such as a touch screen based calculator.

The CPU 104 executes computer readable instructions stored in the memory 108. The I/O processor 112 interfaces the CPU 104 with input and/or output devices, such as the display 116, the touch screen 120, and other input/control devices 124. The I/O processor 112 can include a display controller (not shown) and a touch screen controller (not shown). The touch screen 120 includes one or more of a touch-sensitive surface and a sensor or set of sensors that accepts input from the user based on haptic and/or tactile contact. The touch screen 120 utilizes one or more of currently known or later developed touch sensing technologies, including one or more of capacitive, resistive, infrared, and surface acoustic wave technologies, as well as other proximity sensor arrays or other elements for determining one or more points of contact with the touch screen 120. In an embodiment, the touch screen 120 and the I/O processor 112 (along with any associated modules and/or sets of instructions stored in memory 102 and executed by the CPU 104) can detect multiple points of or instances of simultaneous contact (and any movement or breaking of the contact(s)) on the touch screen 120. Such detected contact can be converted by the CPU 104 into interaction with user-interface that is displayed on the display 116. A user can make contact with the touch screen 120 using any suitable object or appendage, such as a stylus, a finger, etc.

The network interface 128 facilitates communication with a wireless communication network such as a wireless local area network (WLAN), a wide area network (WAN), a personal area network (PAN), etc., via the antenna 132. In other embodiments, one or more different and/or additional network interfaces facilitate wired communication with one or more of a local area network (LAN), a WAN, another computing device such as a personal computer, a server, etc. In some embodiments having one or more additional network interfaces, the device 100 includes one or more additional antenna.

Software components (i.e., sets of computer readable instructions executable by the CPU 104) are stored in the memory 108. The software components can include an operating system, a communication module, a contact module, a graphics module, and applications such as a calculator application, spreadsheet application, word processing application, e-mail application or other applications having a text input area, i.e., an area displayed on the display 116 in which text (e.g., alphanumeric characters) can be input. The operating system can include various software components and/or drivers for controlling and managing general system tasks (e.g., memory management, etc.) and can facilitate communication between various hardware and software components. The communication module can facilitate communication with other devices via the network interface 128.

The contact module can detect contact with touch screen 120 (in conjunction with the I/O processor 112). The contact module can include various software components for performing various operations related to detection of contact, such as determining if contact has occurred and determining if the contact has been broken (i.e., if the contact has ceased).

In some embodiments, the contact module may include components for determining if there is movement of the contact and tracking the movement across the touch screen 120. Determining movement of the point of contact can include determining speed (magnitude), velocity (magnitude and direction), and/or an acceleration (a change in magnitude and/or direction) of the point of contact. These operations can be applied to single contacts (e.g., one finger contacts) or to multiple simultaneous contacts (e.g., "multi-touch"/multiple finger contacts), in some embodiments.

In an embodiment, the device 100 includes a calculator application. The calculator application is configured to enable input, via an input field, of arbitrarily complex expressions that can then be evaluated by the calculator application to generate a result, which is then displayed on the display 116. For example, in some embodiments, a user can input an expression that includes brackets or parentheses to group terms, to specify precedence of operations, etc. As another example, in some embodiments, the calculator application provides for the use of preconfigured functions within the input expression, and brackets or parentheses are used to denote the arguments of the function. As used herein, the term "brackets" refers to a pair of punctuation marks used to group text within the pair of punctuation marks and to set apart the text within the brackets from text outside of the brackets. Examples of brackets includes square brackets ([ ]), round brackets or parentheses (( ), curly brackets ({ }), chevrons (<>), etc. Thus, as used herein, "parentheses" are an example of a type of "bracket". Examples are described below are in the context of parentheses, but the techniques are applicable to other types of brackets as well.

A mathematical expression entered via an input field is an example of a structured object having a plurality of levels in a hierarchy. For example, in an expression having nested brackets including a first set of brackets within a second set of brackets, a hierarchy in the expression may include a first level within the first set of brackets, a second level outside of the first set of brackets and within the second set of brackets, and a third level outside the second set of brackets. In this example and according to an embodiment, the second level is above the first level in the hierarchy, and the third level is above the second level in the hierarchy.

Figure 2:
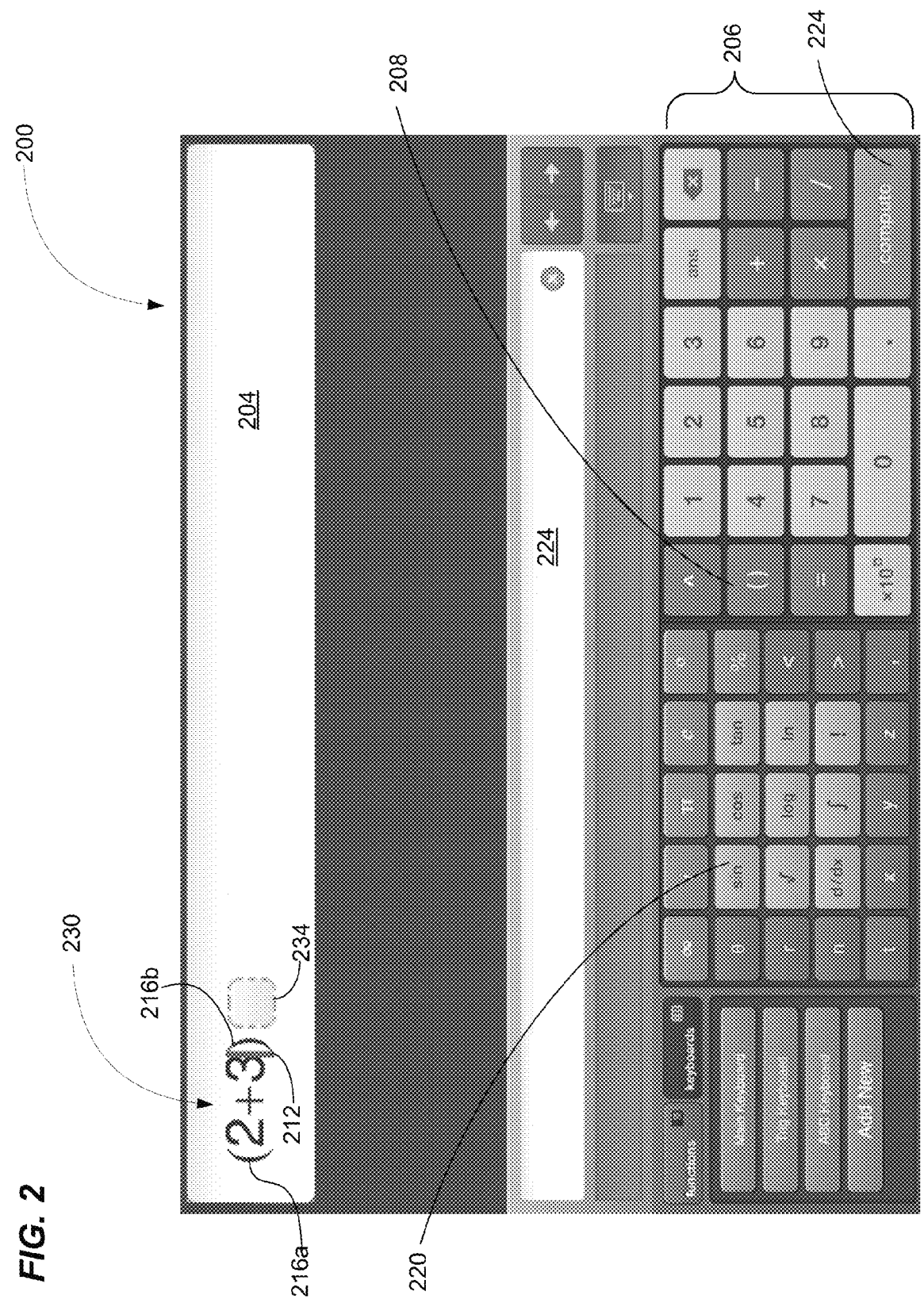
FIG. 2 is an illustration of an example graphical user interface of a calculator application with an input field and at least one cursor positioning pad, according to an embodiment.

FIG. 2 is a diagram of an example graphical user interface 200 of a calculator application, according to an embodiment. In an embodiment, a calculator application having the graphical user interface 200 is implemented on the device 100 of FIG. 1, and the calculator application and the graphical user interface 200 are discussed with reference to FIG. 1 for explanatory purposes. In other embodiments, however, the calculator application having the graphical user interface 200 is implemented on another suitable device.

The user interface 200 is displayed on the display 116, in an embodiment. The user interface 200 includes an input field 204 in which a user can enter an input expression to be evaluated by the calculator application. The user interface 200 also includes a region 206 with buttons for selecting alphanumeric text, mathematical symbols, functions, etc., to then be displayed in the input field 204.

The buttons in the region 206 may correspond to, for example, numbers, symbols, operations, functions and other marks that can be used to create an expression to be evaluated by the calculator application. When a user presses, via the touch screen 120, one of the buttons on the user interface 200, the touch screen 120 registers a user input and sends a signal to be interpreted by the operating system software and/or the calculator application to display the user input in the input field on the display 116. For example, in response to the user pressing a number button (e.g., the number five), the calculator application displays the corresponding number in the input field 204 at a current location of a cursor, and the cursor 212 is then advanced to a next adjacent input location to the right. As another example, in response to the user pressing the button 208, the calculator application displays a pair of parentheses 216 in the input field 204 at a current location of the cursor 212, and the cursor 212 is then moved to within the pair of parentheses 216. As another example, in response to the user pressing the button 220, the calculator application displays the text "sin( )" in the input field 204 at a current location of the cursor 212, where "sin" indicates a preset or preconfigured function of the calculator and the parentheses in "sin( )" denotes arguments of the "sin" function. The cursor 212 is then moved to within the pair of parentheses in the "sin( )". It is to be noted that the user input is not limited to signals received from user input on the touch screen, but may be signals received from a user pressing a button on a separate display or other component such as a hardware keyboard connected to the device via a wired or wireless connection. Wireless connections include, but are not limited to, infrared, PAN connections, WLAN connections, etc.

The area 206 also includes a button 224 to cause the calculator application to evaluate the input expression entered in the input field 204. The result of the evaluation is displayed in a result field 224.

As illustrated in FIG. 2, a mathematical expression 230 has been entered by the user and is displayed in the input field 204. The expression 230 includes a sub-expression within the parentheses 216. The cursor 212 indicates the current input location, i.e., the location at which a new input will be entered in the field 204. For example, as illustrated in FIG. 2, the current input location is immediately to the right of the number three.

The mathematical expression 230 is a structured object having a plurality of levels in a hierarchy. For example, the hierarchy may include a first level within the parentheses 216, and a second level outside of the parentheses 216. In an embodiment, the second level is above the first level in the hierarchy.

In some embodiments, a cursor positioning pad module of, or associated with, the calculator application is configured to analyze the mathematical expression 230 to determine the plurality of levels in the hierarchy of the mathematical expression 230 (e.g., the first level and the second level). Additionally, the cursor positioning pad module is configured to determine in which level the current input location is located, in an embodiment. For example, in FIG. 2, the cursor 212 is located in the first level. Further, the cursor positioning pad module is configured to determine one or more predicted locations in other levels of where the user may choose to move the cursor subsequently from the current location.

A first cursor positioning pad 234 is displayed in the input field 204. Cursor positioning pads, like the first cursor positioning pad 234, are generally for facilitating changing the current input location in an expression displayed in the input field 204 to a predicted location where the user may choose to move the cursor subsequently from the current location. For example, in the example illustrated in FIG. 2, when the user presses the first cursor positioning pad 234, the current input location is moved from within the parentheses 216 to outside of the parentheses 216, in particular to a location immediately to the right of the parenthesis 216b. In embodiments utilizing a touch screen, cursor positioning pads generally have a shape configured to enable easy selection via the touch screen. For example, in one embodiment, the first cursor positioning pad 234 is a square having a width of about ⅓". In other embodiments, however, other suitable shapes and sizes are utilized. Other suitable shapes that may be utilized include rectangles, circles, ovals, etc. Additionally, the size and/or shape of the cursor positioning pad may vary depending on one or more of the size of the display 116, the location of the cursor positioning pad within the field 204, the information adjacent to the cursor positioning pad, the amount of information being displayed within the field 204, etc., in various embodiments.

In some embodiments, a cursor positioning pad is located at or proximate to the location to which the current input location will be moved. For example, in the example illustrated in FIG. 2, the first cursor positioning pad 234 is located generally where the current input location will be moved, e.g., to the location immediately to the right of the parenthesis 216*b*. In other embodiments, the cursor positioning pad is located at a position spaced apart from where the current input location will be moved, but a visual indicator is displayed, the visual indicator configured to visually associate the cursor positioning pad with the location where the current input location will be moved in response to pressing the cursor positioning pad. For example, the visual indicator may be a line, displayed on the display 116, that connects the cursor positioning pad with the new location, or a line connected to or otherwise visually linked to the cursor positioning pad and that visually points to the new location. In some embodiments, the visual indicator includes a line with an end point at or proximate to the new location. In an embodiment, the line includes an arrow head, a rounded end point, etc.

In some embodiments, the cursor positioning pad enables the user to change a position of the current input location from a first area of the input expression to a second area of the input expression. For example, in the illustration of FIG. 2, the first area may be the area of the expression 230 within the parentheses 216 and the second area may be the area of the expression 230 to the right of the parenthesis 216*b*. If the current input location, represented by the cursor 212, is in the first area of the input expression 230 (e.g., within the parentheses 216) and a user desires to move the cursor 212 to within the second area of the input expression 230 (e.g., outside of the parentheses 216 and to the right of the parenthesis 216*b* (for example to further add to the input expression), the user may press the first cursor positioning pad 234. The user input is then registered by the touch screen device which, in response, sends a signal to the to the calculator application 200 (e.g., directly or via the operating system).

The calculator application 200 receives the signal indicating selection of the first cursor positioning pad 234. In response, the calculator application 200 recognizes the user input and moves the current input location, represented by the cursor 220, outside of the first area of the parentheses 216 and to the right of the parenthesis 216*b*.

When the cursor is outside of the parentheses 216, the first cursor positioning pad 234 is no longer displayed on the display 116 (e.g., the first cursor positioning pad 234 is removed from the display 116). At this point the user may continue to edit the input expression 230 by adding to the input expression to the right of the parenthesis 216*b*. In some embodiments, if the user later positions the cursor back within the parentheses 216, the first cursor positioning pad 234 is redisplayed to allow the user to subsequently change the current input location to outside of the parentheses 216 and to a location at the rightmost position in the input expression 230 to allow the user to subsequently change the current input location to the rightmost position in the input expression 230.

In some embodiments in which information has been added to the right of the parenthesis 216*b* and when the user later positions the cursor back within the parentheses 216, a second cursor positioning pad (not shown) is displayed at, or associated with, a location immediately to the right of the parenthesis 216*b* to allow the user to subsequently change the current input location immediately to the right of the parenthesis 216*b*. The second cursor positioning pad (not shown) is displayed in addition to or instead of the first cursor positioning pad 234 at, or associated with, the rightmost position in the input expression 230, in some embodiments and/or scenarios.

In an embodiment, when the first cursor positioning pad 234 is selected by the user, a third cursor positioning pad (not shown in FIG. 2) is then displayed within the parentheses 216 (or otherwise associated with a location within the parentheses 216 (e.g., displayed in connection with a line to indicate the location within the parentheses 216). If the user wishes to once again add information within the parentheses 216, the user can press the third cursor positioning pad (not shown). The user input is then registered by the touch screen device which, in response, sends a signal in to the calculator application 200 (e.g., directly or via the operating system). The calculator application 200 receives the signal and interprets the signal. In response, the calculator application 200 recognizes the user input and moves the current location, represented by the cursor 212, to back within the parentheses 216, e.g., to a location immediately to the left of the parenthesis 216*b*.

In some embodiments, the user can move the cursor 212 independently of the cursor positioning pad 234, e.g., by one or more of pressing the touch screen 120 at a new location within the expression 230, dragging the cursor 212 to a new location, using arrow buttons (not shown), etc. Thus, in some embodiments and/or scenarios, if the user moves the cursor 212 outside of the parentheses 216 using a mechanism other than the cursor positioning pad 234 (e.g., using an arrow button (not shown)), the first cursor positioning pad 234, in response to determining that the cursor 212 has been moved into the second level of the hierarchy of the structured object 230, is no longer displayed on the display 116 (e.g., the first cursor positioning pad 234 is removed from the display 116). In an embodiment, the third cursor positioning pad (not shown in FIG. 2) discussed above, in response to determining that the cursor 212 has been moved outside of the parentheses 216 and into the second level, is then displayed within the first level, e.g., within the parentheses 216, or otherwise associated with a location within the parentheses 216.

In some embodiments, the user may select a cursor positioning pad 234 indirectly, e.g., without touching the cursor positioning pad 234 (in embodiments using a touch screen). For example, a user may make a selection via a graphical user interface element located outside of the input field 204, yet within the touch screen 120, as in an embodiment in which a selection menu or other user interface mechanism (not shown) with a multi-level structure identical to, or mimicking, that of the structured object 230, but with visual characteristics that are different than the object 230, is displayed. Additionally, an application 200 may, for example, provide an application programming interface (API) by which a client application may programmatically select cursor positioning pads, in an embodiment.

Figure 3A:
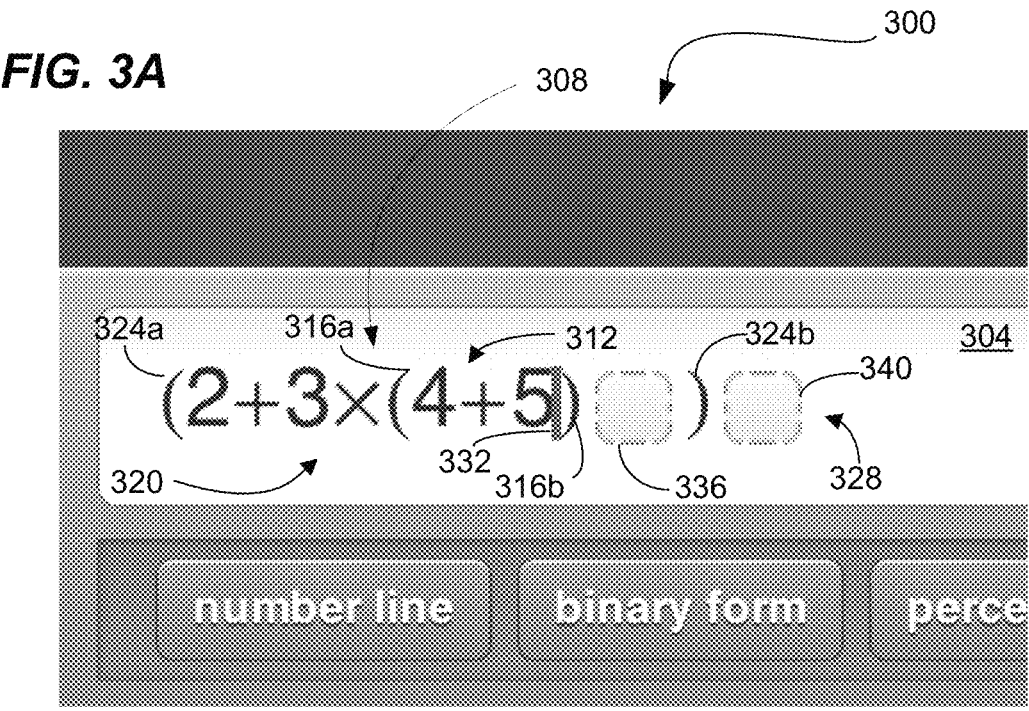
FIGS. 3A and 3B are illustrations of another example graphical user interface of a calculator application with an input field and at least one cursor positioning pad, according to an embodiment.
Figure 3B:
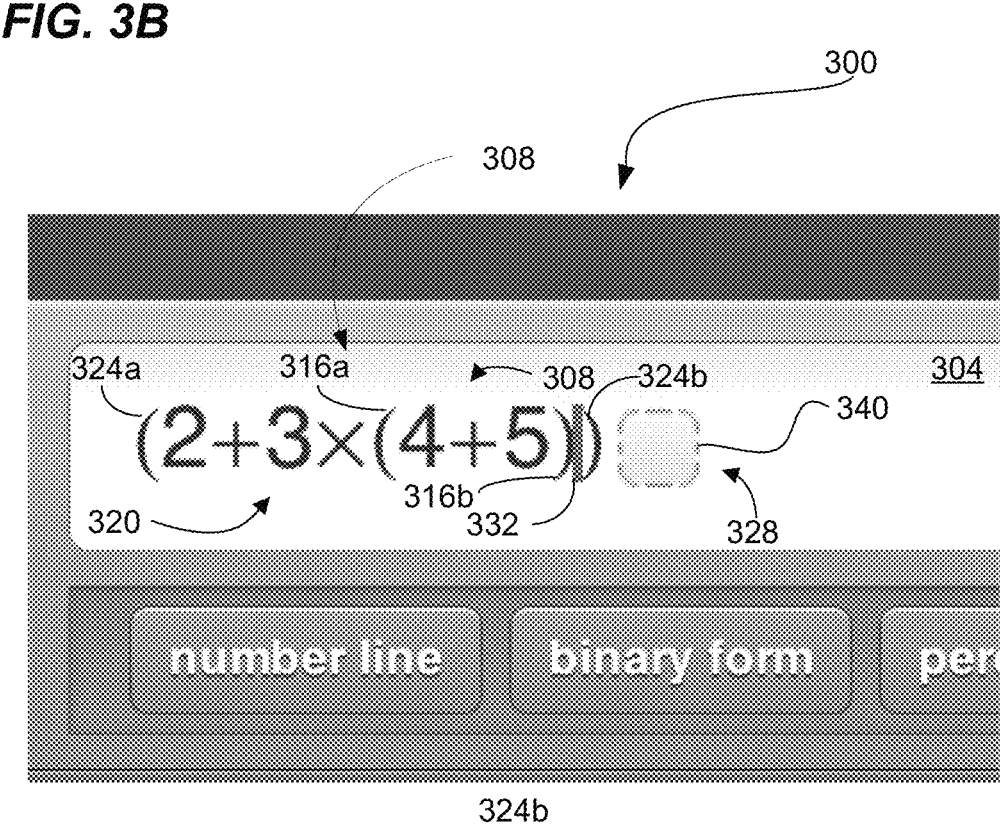

FIGS. 3A and 3B are illustrations of portion of an example graphical user interface 300, according to an embodiment. In an embodiment, a calculator application having the graphical user interface 300 is implemented on the device 100 of FIG. 1, and the calculator application and the graphical user interface 300 are discussed with reference to FIG. 1 for explanatory purposes. In other embodiments, however, the calculator application having the graphical user interface 300 is implemented on another suitable device.

The calculator application causes the graphical user interface 300 to be displayed on the display 116. The user interface 300 includes an input field 304 in which a user can enter an input expression to be evaluated by the calculator application. The user interface 300 also includes an area, only some of which is shown in FIGS. 3A and 3B, with buttons for selecting alphanumeric text, mathematical symbols, functions, etc., to then be displayed in the input field 304. The graphical user interface 300 may be the same as or similar to the graphical user interface illustrated in FIG. 2, in some embodiments. In FIGS. 3A and 3B, an input expression 308 has been entered by the user in the field 304.

The input expression 308 has a first area 312 within parentheses 316, a second area 320, outside of parentheses 316 but within parentheses 324, and a third area 328 outside of both parentheses 316 and parentheses 324, and to the right of parenthesis 324b. The parentheses 316 and parentheses 324 are nested, and in particular, the parentheses 316 are within the parentheses 324.

The mathematical expression 308 is a structured object having a plurality of levels in a hierarchy. For example, the hierarchy may include a first level within the parentheses 316, a second level outside of the parentheses 316 and within the parentheses 324, and a third level outside of the parentheses 324. In an embodiment, the third level is above the second level in the hierarchy, and the second level is above the first level in the hierarchy.

A current input location is indicated by a cursor 332. As illustrated in FIG. 3A, the current input location is within the parentheses 316, i.e., in the first level of the hierarchy. A first cursor positioning pad 336 is displayed in the second level, e.g., outside of the parentheses 316, to the right of the parenthesis 316b, and to the left of the parenthesis 324b. A second cursor positioning pad 340 is displayed in the third level, e.g., outside of both the parentheses 316 and the parentheses 324, to the right of the parenthesis 324b.

If the current input location, represented by the cursor 332, is within the first area 312 (and in the first level in the hierarchy) and the user desires to move the current input location to within the second level, the user may press the first cursor positioning pad 336. In response to this press, the calculator application may determine that the user selected the first cursor positioning pad 336 in a manner such as described above. In response, the calculator application recognizes the user input and moves the current input location, represented by the cursor 332, outside of the first area 312 to within the second level in the hierarchy, in particular to between the parenthesis 316b and the parenthesis 324b. When the cursor is within the second level of the hierarchy of the structured expression 308, the first cursor positioning pad 336 is no longer displayed.

FIG. 3B illustrates the portion of the graphical user interface 300 after the user has selected the first cursor positioning pad 336. As can be seen in FIG. 3B, the first cursor positioning pad 336 is no longer displayed (e.g., it is removed from the graphical user interface 300). Additionally, the calculator application caused the current input location to be moved to outside of the first area 308 (in the first level of the hierarchy) to within the second area 320 (in the second level of the hierarchy) of the input expression, and in particular, to a location between the parenthesis 316b and the parenthesis 324b. In some embodiments, a third cursor positioning pad (not shown) is also then displayed in, or otherwise visually associated or connected with, the first area 308 (in the first level of the hierarchy) of the input expression 308. For example, in one embodiment, the third cursor positioning pad is displayed at a location immediately to the left of the parenthesis 316b.

At this point, the user may continue to edit the second area 320 (in the second level) of the mathematical structure 302. If the user wishes to once again edit the first area 308 (in the first level) of the mathematical structure 302, the user can press the third cursor positioning pad (not shown) to move the current input location to within the first area 308.

On the other hand, if the user desires to edit the third area 328 (in the third level of the hierarchy) of the input expression 308, the user can touch the second cursor positioning pad 340. In response to this press the calculator application may determine that the user selected the second cursor positioning pad 340 in a manner such as described above. In response, the calculator application 300 recognizes the user input and moves the current input location, represented by the cursor 332, to outside of the second area 320 to within the third area 328. When the current location, represented by the cursor 332, is within the third area 328 (in the third level of the hierarchy), the second cursor positioning pad 340 is not displayed in the graphical user interface 300. In some embodiments, the first cursor positioning pad 336 is then displayed in the second area 308 (in the second level of the hierarchy) of the mathematical structure 302, and/or the third cursor positioning pad (discussed above) is also displayed within the within the first area 308 (in the first level of the hierarchy) of the input expression.

In some embodiments, the user can move the cursor 332 without using a cursor positioning pad by, for example, one or more of pressing the touch screen 120 at a new location within the expression 308, dragging the cursor 332 to a new location, using arrow buttons (not shown), etc. Thus, in some embodiments and/or scenarios, if the user moves the cursor 332 to within the second area 320 (in the second level of the hierarchy) using a mechanism other than the first cursor positioning pad 336 (e.g., using an arrow button (not shown)), the first cursor positioning pad 336, in response to determining that the cursor 332 has been moved to within the second area 320 (in the second level of the hierarchy), is no longer displayed on the display 116 (e.g., the first cursor positioning pad 336 is removed from the display 116). In an embodiment, the third cursor positioning pad (not shown in FIGS. 3A and 3B) discussed above, in response to determining that the cursor 332 has been moved outside of the first area 312 (in the first level of the hierarchy), is then displayed within the parentheses 316 in the first level of the hierarchy (or otherwise visually connected or associated with a location within the parentheses 316).

The cursor positioning pad module may be configured to predict one or more likely positions within the input expression to which the user may wish to move the current input location (as indicated by a cursor). Predictions of likely positions may be generated based on one or more of (i) the current input location, (ii) the mathematical elements or functions already entered into the input expression, (iii) the current structure of the input expression (e.g., the nesting structure of brackets, functions, etc.). For example, generation of predictions may include applying rules to the current input expression. For example, a first rule may be that, when the cursor is currently located within a level of a structured expression having a plurality of levels in a hierarchy, the user will likely wish to move the cursor to one or more different levels in the hierarchy. As another example, a second rule may be that, when the cursor is currently located within a current level in the hierarchy hierarchy, the user will likely wish to move the cursor to one or more higher levels (i.e., one or more levels above the current level) in the hierarchy. As a further example, a third rule may be that, when a user wishes to move the cursor from one level to another, the user will likely wish to move the cursor to the rightmost position in the other level. As a further example, a fourth rule may be that, when a user wishes to move the cursor from one level to another, the user will likely wish to move the cursor to the leftmost position in the other level.

As another example, a fifth rule may be that, when the input expression includes a pair of brackets and the current input location is within the brackets, the user will likely wish to move the cursor outside of the brackets to a position immediately to the right of the right-hand bracket. A sixth rule may be that, when the input expression includes a pair of brackets and the current input location is outside of the brackets, the user will likely wish to move the cursor back inside the brackets to a position immediately to the left of the right-hand bracket.

Figure 4A:
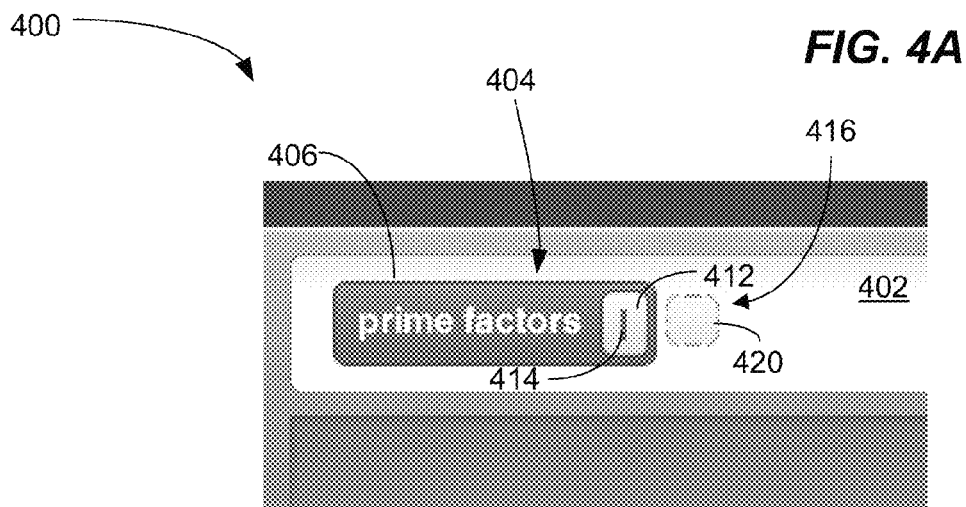
FIGS. 4A-4C are illustrations of an example graphical user interface of a calculator application with an input field and at least one cursor positioning pad, according to an embodiment.
Figure 4B:
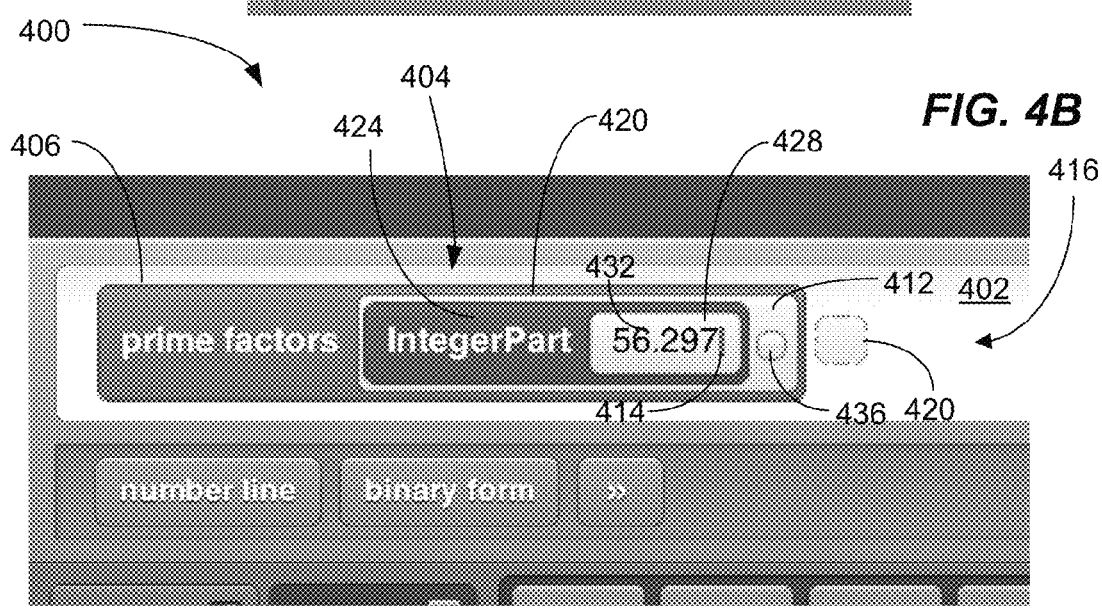
Figure 4C:
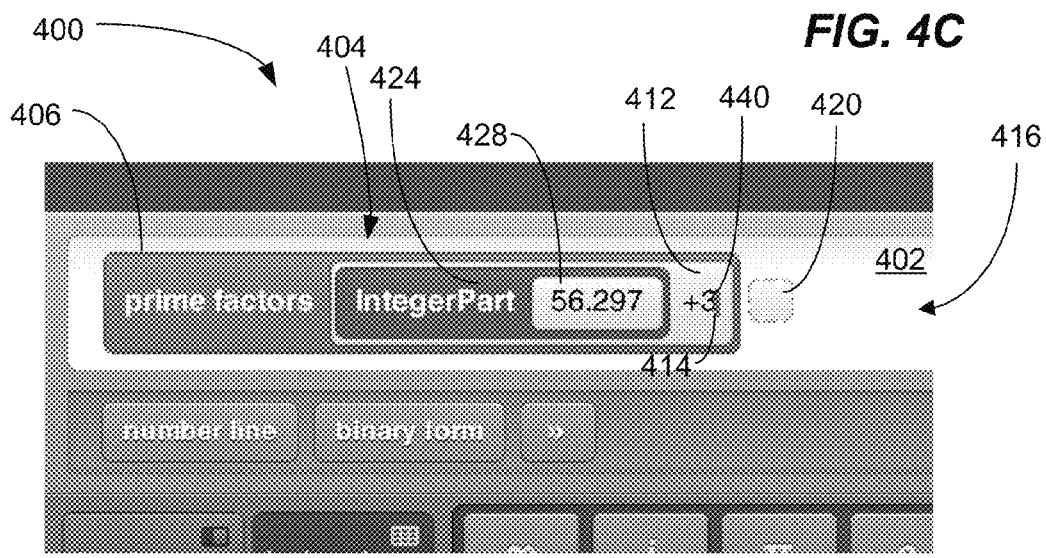

FIGS. 4A-4C are illustrations of a portion of an example graphical user interface 400, according to an embodiment. In an embodiment, a calculator application having the graphical user interface 400 is implemented on the device 100 of FIG. 1, and the calculator application and the graphical user interface 400 are discussed with reference to FIG. 1 for explanatory purposes. In other embodiments, however, the calculator application having the graphical user interface 400 is implemented on another suitable device.

The calculator application causes the graphical user interface 400 to be displayed on the display 116. The user interface 400 includes an input field 402 in which a user can enter an input expression to be evaluated by the calculator application. The user interface 400 also includes an area, only some of which is shown in FIGS. 4A and 4B, with buttons for selecting alphanumeric text, mathematical symbols, functions, etc., to then be displayed in the input field 402. The graphical user interface 300 may be the same as or similar to the graphical user interface illustrated in FIG. 2, in some embodiments.

FIGS. 4A-4C illustrate an input expression 404 entered by the user in the field 402 at various stages. For example, in FIG. 4A, the user has entered a first function 406 (e.g., a "prime factors" function) having a first function argument area 412. Within the first function argument area 412 of the first function 406 is a cursor 414 representing a current input location within the input field 402. The current input location in the input field 402 is the point where the next user input will be entered.

In the illustration of FIG. 4A, the first function argument area 412 corresponds to a first area of the expression 404 and a second area 416 of the expression corresponds to a position outside of the first area 412 and to the right of the first function 406. A first cursor positioning pad 420 is displayed within the second area 416. The expression 404 is a structured expression having a plurality of levels in a hierarchy, including a first level and a second level. For example, the first level corresponds to the area 412 and the second level corresponds to the area 416. The second level is above the first level in the hierarchy.

If a user wishes to edit the second area 416 of the input expression 404, the user may press the first cursor positioning pad 420 which causes the current input location to move to the second area 416 in the second level of the hierarchy (e.g., just to the right of the function 406) and to move the cursor 414 to the corresponding new position of the current input location. Alternatively, the user may wish to enter an additional function within the first argument area 412 of the first function 406.

Turning now to FIG. 4B, a user has input a second function 424 (e.g., an "integer part" function) within the first argument area 412 of the first function 406. The second function 424 is nested within the first function 406. In a second function argument area 428 of the second function 424, a user has input a first text input 432. The current input location, represented by the cursor 414, is displayed within the second function argument area 428 of the second function 424. The hierarchy of the structured expression 404 now includes a third level corresponding to the area 428. The third level is below the first level (e.g., within the area 412 but outside of the second function 424) in the hierarchy.

The first cursor positioning pad 420 remains displayed in the second area 416. Additionally, a second cursor positioning pad 424 is now displayed within the first function argument area 412 and outside of the second function argument area 428.

If the user desires to input additional text, such as a number, symbol, function, etc., within the first function argument area 412 of the first function 408, the user may press the second cursor positioning pad 436. The calculator application may determine that the user selected the second cursor positioning pad 436 in a manner such as described above. In response, the calculator application recognizes the user input and moves the current input location, represented by the cursor 414, outside of the second argument area 428 to the first function argument area 412.

FIG. 4C illustrates the graphical user interface 400 after the user selected the second cursor positioning pad 436. The second cursor positioning pad 436 is no longer displayed, and the user input location and the cursor 414 have been moved outside of the second function argument area 428 to the first function argument area 412. The first cursor positioning pad 420 remains displayed within the second area 416.

If the user desires to input text into the second area 416 of the input expression, the user may press the first cursor positioning pad 420. The calculator application may determine that the user selected the first cursor positioning pad 420 in a manner such as described above. When the calculator application 400 recognizes the user input, it may move the current input location, represented by the cursor 414, to the second area 416 of the mathematical structure 404. Additionally, first cursor positioning pad 420 is no longer displayed. In some embodiments and/or implementations, the second cursor positioning pad 436 is redisplayed within the first function argument area 412.

As discussed above, the calculator application may be configured to predict one or more likely positions within the input expression to which the user may wish to move the current input location (as indicated by a cursor), and such predictions may be generated based on rules such as: when the input expression includes a function with an argument area, and the current input location is within the argument, the user will likely wish to move the cursor outside of the argument area to a position immediately to the right of the function. Another example rule is: when the input expression includes a function with an argument area and the current input location is outside of the argument area, the user will likely wish to move the cursor back inside the argument area to a right-most position in the argument area, a left-most position within the argument area, etc.

Figure 5A:
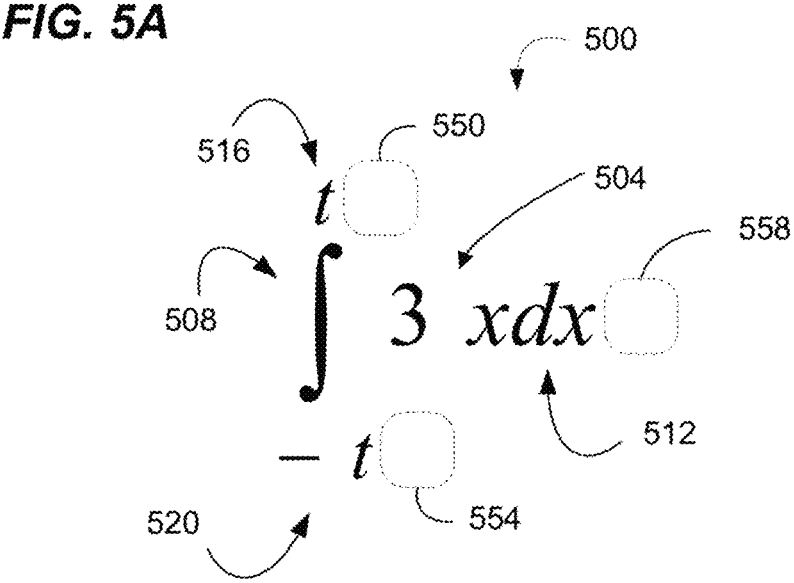
FIG. 5A is an illustration of an example display of a calculator application with an expression and multiple cursor positioning pads, according to an embodiment.

Although the examples described above involve hierarchies, similar techniques may be utilized with expressions having a structure in a multi-dimensional coordinate space. For instance, FIG. 5A illustrates an example expression 500 that may be displayed on a display device by an application such as the calculator application described above. The expression 500 includes a first area 504 between an integral sign 508 and a symbol 512. The first area 504 corresponds to a first level associated with a first coordinate pair. The expression 500 includes a second area 516 corresponding to an upper limit of the integral. The second area 516 corresponds to a second level associated with a second coordinate pair. The expression 500 includes a third area 520 corresponding to a lower limit of the integral. The third area 520 corresponds to a third level associated with a third coordinate pair. The expression 500 also includes a fourth area outside of the integral. The fourth area corresponds to a fourth level associated with a fourth coordinate pair.

Figure 5B:
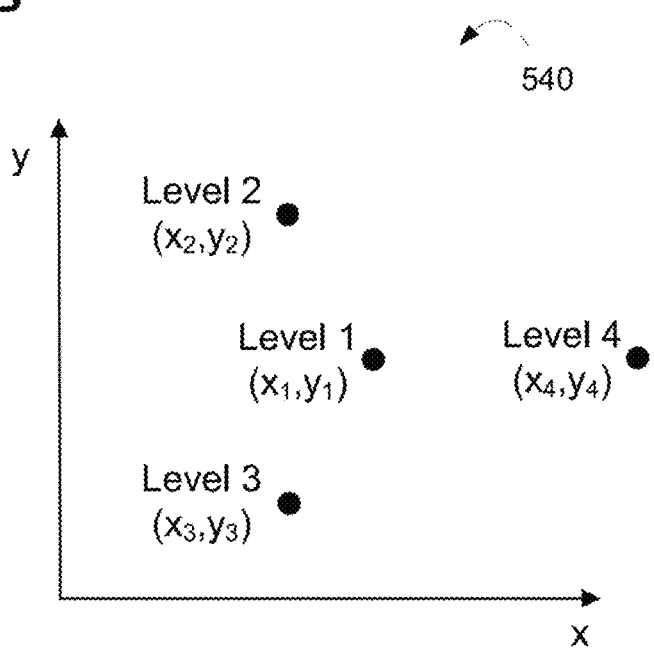
FIG. 5B is a diagram of an example multi-dimensional structure corresponding to the expression illustrated in FIG. 5A, according to an embodiment.

FIG. 5B is a diagram illustrating an example structure 540 corresponding to the expression 500, according to an embodiment. In the structure 540, the first level is associated with a first coordinate pair $(x_1,y_1)$, the second level is associated with a second coordinate pair $(x_2,y_2)$, the third level is associated with a third coordinate pair $(x_3,y_3)$, and the fourth level is associated with a fourth coordinate pair $(x_4,y_4)$. In an embodiment, $x_2$ equals $x_3$, and $y_1$ equals $y_4$.

Various suitable rules for determining one or more predictions of one or more levels to which a user may wish to navigate the input position may be utilized, where predictions are determined based on the level in which the input position is currently located. For example, in the illustration of FIG. 5A, a cursor (not shown) is located in the first area 504 (corresponding to the first level/first coordinate pair). The cursor positioning pad module, in response to determining the cursor is at the first levels/coordinate pair, may predict locations to which the user may wish to subsequently navigate the cursor, such locations corresponding to the second, third, and fourth levels/coordinate pairs. Then, the cursor positioning pad module displays cursor positioning pads in the predicted locations. For example, a cursor positioning pad 550 is displayed at or associated with a location corresponding to the second coordinate pair, and a cursor positioning pad 554 is displayed at or associated with a location corresponding to the third coordinate pair. Similarly, a cursor positioning pad 558 is displayed at or associated with a location corresponding to the fourth coordinate pair.

In some embodiments, a graphical user interface element may be provided (not shown) which a user can successively press, click, or otherwise activate having the effect of cycling a cursor from one cursor positioning pad to another is some specified order.

In some embodiments, a multi-dimensional coordinate space may be considered a multi-dimensional matrix, where different levels of the structured object correspond to respective elements of the matrix.

In an embodiment, the cursor positioning pad module is configured to determine a current level in the hierarchy at which the current input position (e.g., the current position of the cursor) is located, and then determine one or more predictions of one or more locations only in levels above the current level in the hierarchy to which a user may wish to navigate the input position. In another embodiment, the cursor positioning pad module is configured to determine a current level in the hierarchy at which the current input position (e.g., the current position of the cursor) is located, and then determine one or more predictions of one or more locations only in levels above the current level in the hierarchy, or levels in the hierarchy equivalent to the current level, to which a user may wish to navigate the input position. In another embodiment, the cursor positioning pad module is configured to determine a current level in the hierarchy at which the current input position (e.g., the current position of the cursor) is located, and then determine one or more predictions of one or more locations only in levels different than the current level in the hierarchy, including levels in the hierarchy equivalent to the current level, to which a user may wish to navigate the input position. Next, the cursor positioning pad module displays one or more cursor positioning pads at the predicted one or more locations.

Techniques such as described above can be used in other types of applications. For example, similar techniques can be used in spreadsheet applications. For example, cursor positioning pads can be utilized to permit navigating within an input expression to be entered into, or already within, a cell of the spreadsheet. The spreadsheet application may be configured to predict one or more likely positions within the input expression to which the user may wish to move the current input location (as indicated by a cursor), and such predictions may be generated based on rules such as described above or rules more specific to spreadsheet applications, in an embodiment.

As another example, similar techniques can be used in word processing applications. For example, cursor positioning pads can be utilized to permit navigating a cursor within a paragraph, to move the cursor within or outside of brackets or pairs of quotation marks, to navigate between nested brackets or quotation marks, etc. In an embodiment, the word processing application may be configured to predict one or more likely positions within a document to which the user may wish to move the current input location (as indicated by a cursor), and such predictions may be generated based on rules such as described above or rules more specific to word processing applications. For example, if the word processing application is configured to detect misspellings or other errors, a rule may specify that a user is likely to position a cursor at the error (e.g., to the right of the error, to the left of the error, etc.), in an embodiment. Regarding such rules, there may be different rules for different types of errors, such as a first predicted cursor placement rule for misspellings and a second predicted cursor placement rule for punctuation errors.

In an embodiment, a sentence within a word processing document may be considered a structured object. For example, brackets in a sentence may be treated in a manner similar to the example mathematical expressions described above. As another example, quotations may be treated as brackets in a manner similar to the example mathematical expressions described above. In an embodiment, a word processing document may be considered having a multidimensional hierarchy, where sentences are at equivalent first levels, paragraphs are at equivalent second levels, sub-headings are at equivalent third levels, headings are at equivalent fourth levels, etc., where the first levels are below the second levels; the second levels are below the third levels; and the third levels are below the fourth levels. In an embodiment, the word processing application may be configured to predict one or more likely positions within a document to which the user may wish to move the current input location (as indicated by a cursor), and such predictions may be generated based on rules such as described above or rules more specific to word processing applications. For example, in an embodiment, the cursor positioning pad module is configured to determine a current level in the hierarchy at which the current input position (e.g., the current position of the cursor) is located, and then determine one or more predictions of one or more locations only in levels above the current level in the hierarchy to which a user may wish to navigate the input position. As an example, if a cursor is located within a sentence of a paragraph, cursor positioning pads may be located at one or more of (i) a beginning and/or an end of the paragraph, (ii) beginnings and/or endings of other paragraphs, (iii) beginnings and/or endings of headings, etc., according to an embodiment.

In an embodiment, code or data in a programming language may be considered a structured object. For example, blocks of source code delimited by brackets or whitespace may be treated in a manner similar to the mathematical expressions described above. In an embodiment, source code being edited via a text-editor may be considered to have a multidimensional hierarchy, where lines and columns are considered to be matrix coordinates. In an embodiment, the text editor may be configured to predict one or more likely positions within the code to which the user may wish to move the current input location (as indicated by the cursor), and such predictions may be generated by rules as described above or by rules more specific to text editing of source code. For example, in an embodiment, a text editor may be configured to insert cursor positioning pads in place of formal parameters upon an event such as the insertion, by the user, of a specific textual pattern such as a function definition. A text editor could be configured, in an embodiment, to insert cursor positioning pads depending upon the structure of the computer program being edited. For example, if a cursor is located in the first function of a class that contains three function definitions, then a text editor could be configured, in an embodiment, to attach cursor positioning pads to each of the other two functions. In addition to placing a positioning pad based upon program context, a cursor positioning pad module could be configured to insert positioning pads based on program execution, for example, by placing a positioning pad at the end of a line in which an error in syntax has been discovered by a code parser or as the result of compilation or interpretation.

Although examples described above were in the context of entry of data such as text into an expression, similar techniques may be utilized in other contexts that do not necessarily involve entering data into an expression. For example, similar techniques can be used in the context of navigating a structured object. For instance, in an embodiment, positioning pads can be utilized to facilitate navigating a file structure having folders, sub-folders, and files stored within folders and/or sub-folders. For instance, positioning pads may be utilized, when the file structure is displayed via a display device, to select, open, and/or close folders or sub-folders, select and/or open files, etc., according to an embodiment. In this example, positioning pads may be considered to facilitate moving a position of interest on the structured object (e.g., the file structure).

Figure 6:
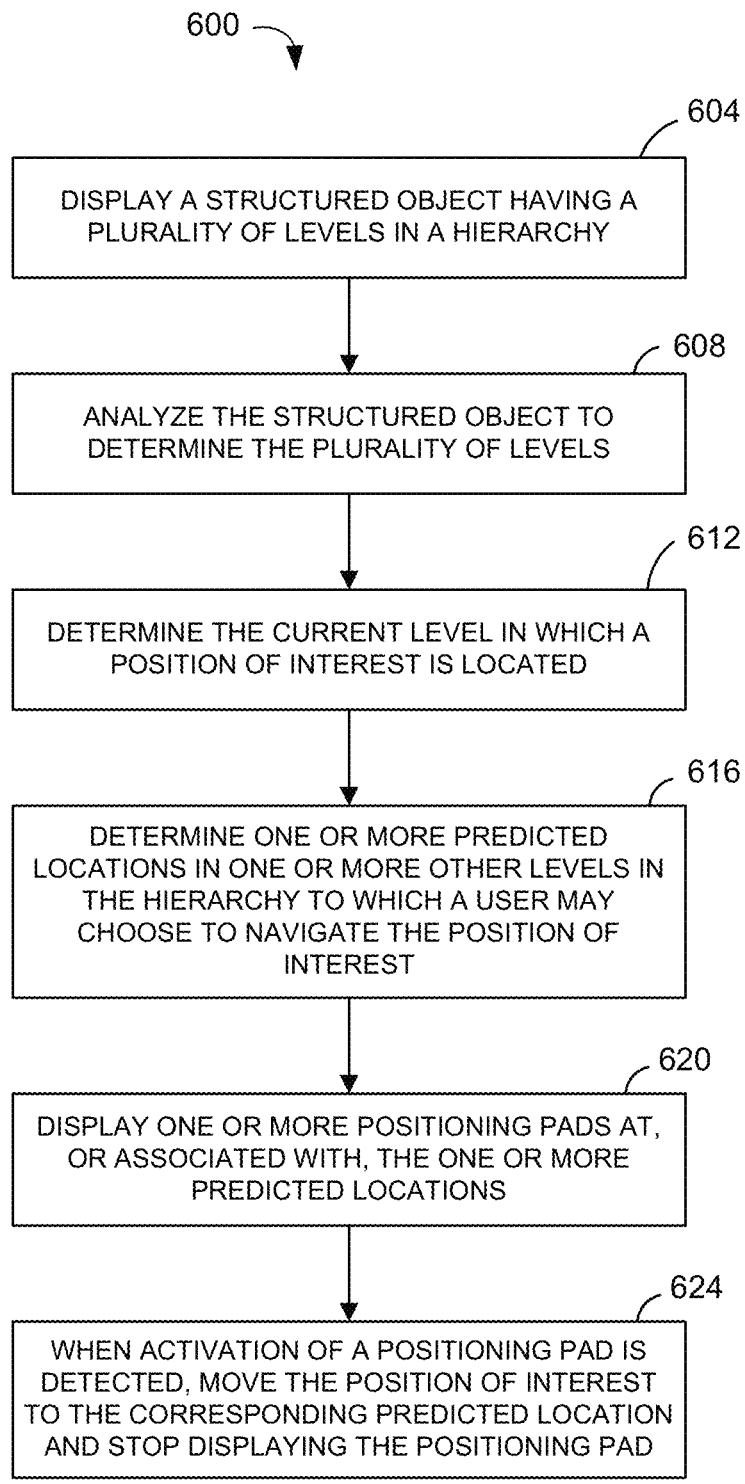
FIG. 6 is a flow diagram of an example method for facilitating movement of a position of interest with positioning pads, according to an embodiment.

FIG. 6 is a flow diagram of an example method 600 for facilitating movement of a position of interest (e.g., indicated by a cursor) on a structured object displayed via a display device of, or coupled to, a computing device, according to an embodiment. In an embodiment, the method 600 is implemented by the device 100 of FIG. 1, and the method 600 will be described with reference to FIGS. 1, 3A, and 3B for illustrative purposes. In other embodiments, however, the method is implemented by another suitable device and/or in conjunction with other types of structured objects.

At block 604, a structured object is displayed via the display device, where the structured object has a plurality of levels in a hierarchy. For example, the expression 308 may be displayed on the display device 116, where the expression 308 has a plurality of levels in a hierarchy as discussed above.

At block 608, the structured object is analyzed to determine plurality of levels. For example, the cursor positioning module executed by the processor 104, or some other suitable module, analyzes the expression 308 to determine the plurality of levels in the hierarchy as discussed above. For example, in the expression 308, the hierarchy may include a first level within the parentheses 316, a second level outside of the parentheses 316 and within the parentheses 324, and a third level outside of the parentheses 324. In an embodiment, the third level is above the second level in the hierarchy, and the second level is above the first level in the hierarchy.

At block 612, the current level in the hierarchy in which the position of interest is currently located is determined. For example, the cursor positioning module executed by the processor 104, or some other suitable module, determines the current level of a current input position in the expression 308, as indicated by the cursor 332. In FIG. 3A, the current input position, as indicated by the cursor 332, is located in the first level. In FIG. 3B, the current input position, as indicated by the cursor 332, is located in the second level of the hierarchy.

At block 616, one or more predicted locations in one or more other levels in the hierarchy (i.e., levels different than the current level) to which a user may choose to navigate the position of interest are determined. For example, the cursor positioning module executed by the processor 104, or some other suitable module, determines the one or more predicted locations based on the determination of the current level. In the scenario illustrated in FIG. 3A, two predicted locations in the second level and the third level are determined. In the scenario illustrated in FIG. 3B, a predicted location in the third level is determined, in an embodiment. In the scenario illustrated in FIG. 3B, multiple predicted locations in the first level and/or the third level are determined, in an embodiment.

Predictions of likely locations to which a user may navigate the position of interest may be generated based on one or more of (i) the current location of the position of interest, (ii) the current level in which the position of interest is currently located, (iii) characteristics of the structured object, (iv) the current structure of the structured object (e.g., if the structure can change over time), (v) the hierarchy, etc. For example, generation of predicted locations may include applying rules. For example, a first rule may be that, when the position of interest is located within the current level, the user will likely wish to move the position of interest to one or more levels in the hierarchy different than the current level. As another example, a second rule may be that, when the position of interest is located in the current level, the user will likely wish to move the cursor only to one or more higher levels (i.e., one or more levels above the current level) in the hierarchy, i.e., not to one or more lower levels in the hierarchy. As another example, a third rule may be that, when the position of interest is located in the current level, the user will likely wish to move the cursor only to one or more lower levels (i.e., one or more levels below the current level) in the hierarchy, i.e., not to one or more higher levels in the hierarchy.

At block 620, one or more positioning pads are displayed at, or associated with, the one or more predicted locations determined at block 616. For example, the cursor positioning module executed by the processor 104, or some other suitable module, causes the cursor positioning pad 336 and/or the cursor positioning pad 340 to be displayed on the display device 116.

At block 624, when activation of a positioning pad is detected, the position of interest is moved to the location at, or associated with, the activated positioning pad. Additionally, when activation of a positioning pad is detected, the activated positioning pad may not be displayed. For example, when the cursor positioning pad 336 in FIG. 3A is activated, the cursor 332 is moved to the location of the cursor positioning pad 336 and the cursor positioning pad 336 is no longer displayed, as illustrated in FIG. 3B.

In some embodiments, block 624 may include ending display of positioning pads corresponding to levels in the hierarch below the new current level. In some embodiments, block 624 may include continuing to display positioning pads corresponding to levels in the hierarch above the new current level.

Blocks 612, 616, 620, and 624 may be repeated as the position of interest is moved to different locations on the structured object, for example via activation of positioning pads or by other means, according to some embodiments. Block 608 may also be repeated if and when the structured object changes, according to some embodiments.

Figure 7A:
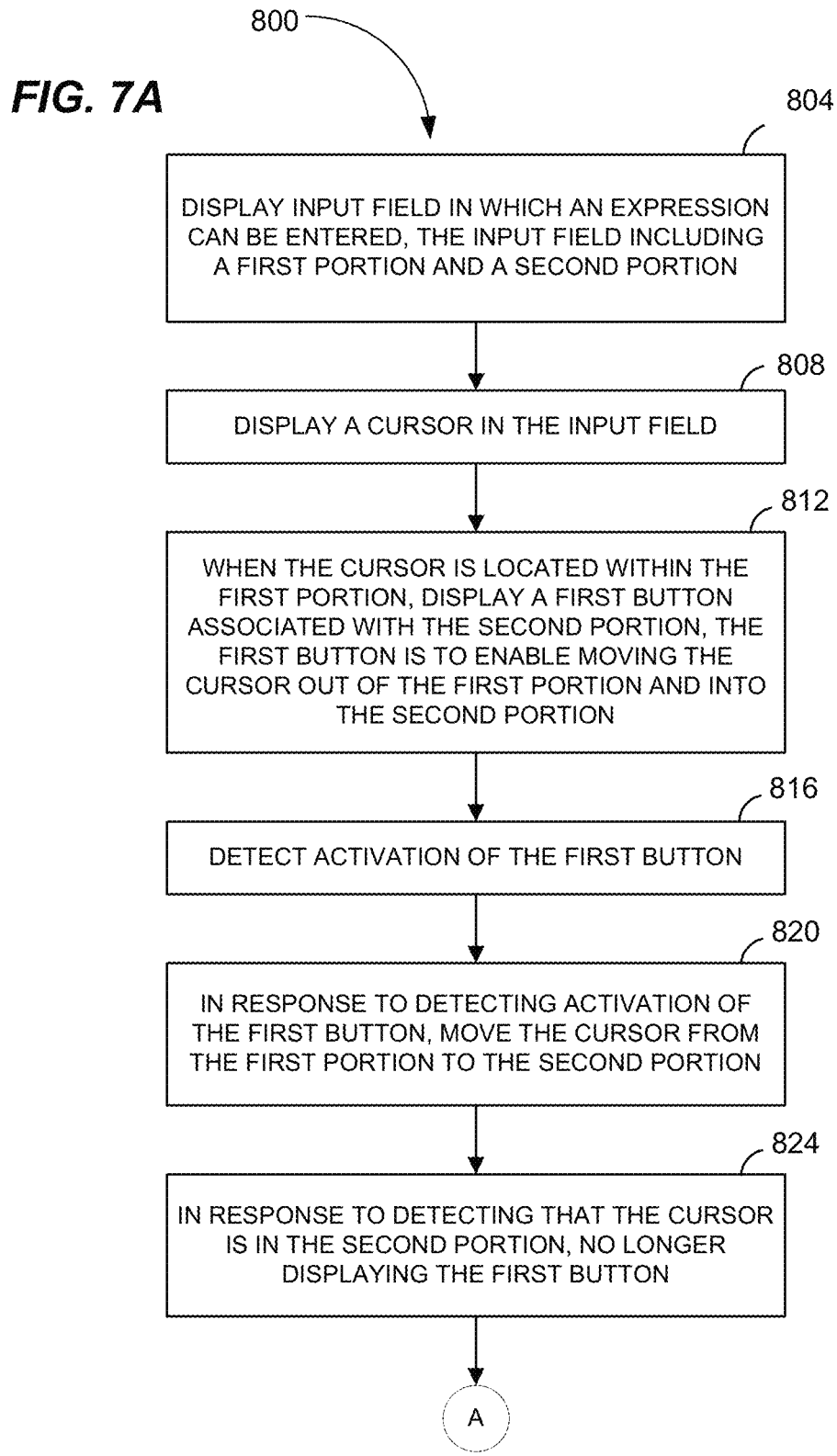
FIGS. 7A and 7B are a flow diagram of an example method for moving a cursor within an input field, according to an embodiment.
Figure 7B:
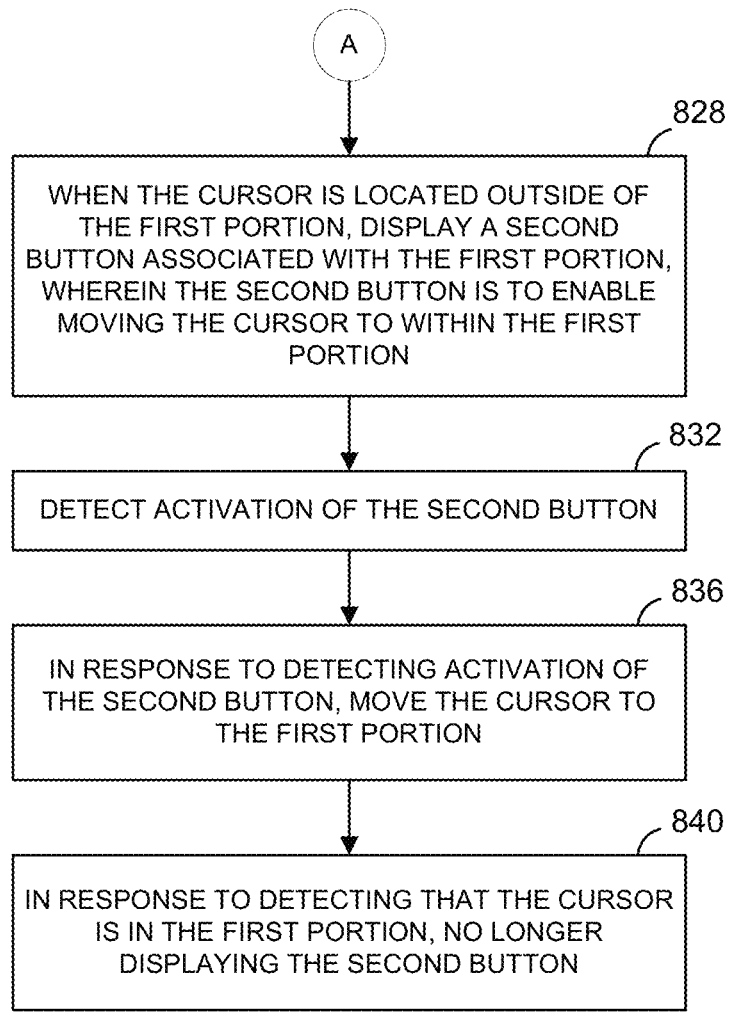

FIGS. 7A and 7B illustrate a flow diagram of an example method 800 for moving a cursor on a display of a computing device, according to an embodiment. In an embodiment, the method 800 is implemented by the device 100 of FIG. 1, and the method 800 will be described with reference to FIG. 1 for illustrative purposes. In other embodiments, however, the method is implemented by another suitable device.

At block 804, an input field is displayed on a display device, wherein the input field includes at least a first area, and a second area. The input field may be for inputting an expression to be evaluated by an application, such as a calculator application, a spreadsheet application, etc. The display device is associated with a touch screen. At block 808, a cursor is displayed in the input field.

At block 812, when the cursor is located within the first area of the input field, a first cursor positioning pad associated with the second area of the input field is displayed. The first cursor positioning pad may be displayed in the second area or otherwise visually associated with the second area. The first cursor positioning pad is for enabling a user to move the cursor out of the first area of the input field and into the second area of the input field. The first cursor positioning pad may be displayed in response to predicting that a user is likely to reposition the cursor to the second area of the input field. In an embodiment, first cursor positioning pad may be displayed in accordance with one or more rules, such as described above, related to predicting where a user is likely to reposition the cursor.

At block 816, activation of the first cursor positioning pad is detected. At block 820, in response to detecting activation of the first button, the cursor is moved from the first area of the input field and into the second area of the input field. At block 824, the first cursor positioning pad is no longer displayed. For example, the first cursor positioning pad is no longer displayed in response to detecting that the cursor is in the second area, in response to detecting activation of the first cursor positioning pad, etc., in various embodiments.

At block 828, when the cursor is located outside of the first area, a second cursor positioning pad is displayed within or otherwise visually associated with the first area. The second cursor positioning pad is to enable moving the cursor to within the first area. The second cursor positioning pad may be displayed in response to predicting that a user is likely to reposition the cursor to the first area of the input field. In an embodiment, second cursor positioning pad may be displayed in accordance with one or more rules, such as described above, related to predicting where a user is likely to reposition the cursor.

At block 832, activation of the second cursor positioning pad is detected. At block 836, in response to detecting activation of the second cursor positioning pad, the cursor is moved into the first area of the input field. At block 840, the second cursor positioning pad is no longer displayed. For example, the second cursor positioning pad is no longer displayed in response to detecting that the cursor is in the first area, in response to detecting activation of the second cursor positioning pad, etc., in various embodiments.

Figure 8A:
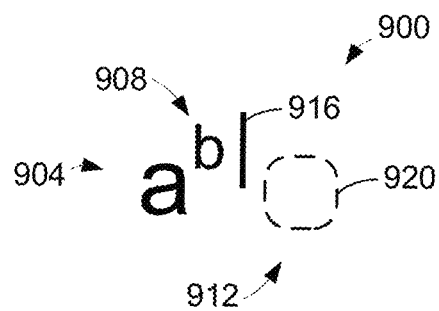
FIGS. 8A-8D are illustrations of an example display that may be shown in a display of a calculator application, according to an embodiment.
Figure 8B:
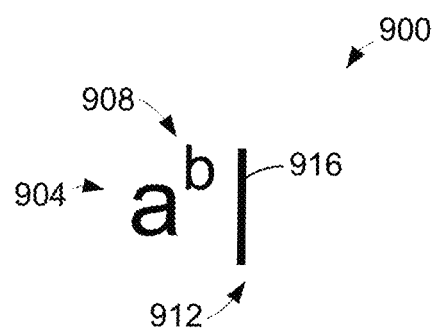

FIGS. 8A and 8B illustrate an example display 900 that may be displayed on a display device by an application such as the calculator application described above. The display 900 includes an input expression 904. The input expression 904 has a first area 908 that corresponds to an exponent of the expression 904, and a second area 912 to the right of the expression and outside of the exponent.

The expression 904 is a structured object having a plurality of levels in a hierarchy. For example, the first area 908 may correspond to a first level, and the second area 912 may correspond to a second level. The second level is above the first level in the hierarchy, in an embodiment.

A current input location is indicated by a cursor 916. As illustrated in FIG. 8A, the current input location is in the first area 908, i.e., in the first level of the hierarchy. A cursor positioning pad 920 is displayed in the second level to the right of the expression 904.

If the current input location, represented by the cursor 916, is within the first area 908 (and in the first level in the hierarchy) and the user desires to move the current input location to within the second level, the user may press the cursor positioning pad 920. In response to this press, the calculator application may determine that the user selected the cursor positioning pad 920 in a manner such as described above. In response, the calculator application recognizes the user input and moves the current input location, represented by the cursor 916, outside of the first area 908 to within the second level in the hierarchy, in the area 912. When the cursor is within the second level of the hierarchy of the structured expression 904, the cursor positioning pad 920 is no longer displayed.

FIG. 8B illustrates the display 900 after the user has selected the cursor positioning pad 920. As can be seen in FIG. 8B, the cursor positioning pad 920 is no longer displayed (e.g., it is removed from the display 900). Additionally, the calculator application caused the current input location to be moved to outside of the first area 908 (in the first level of the hierarchy) to within the second area 912 (in the second level of the hierarchy) of the input expression, and in particular, to a location to the right of the expression 904.

Figure 8C:
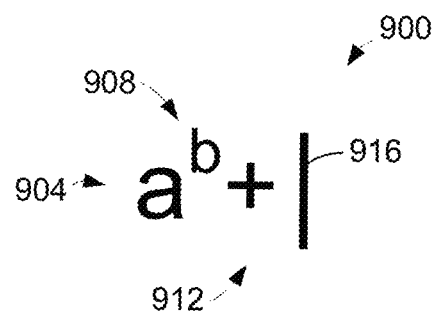

In some embodiments, techniques for assuming that a user wishes to move the position of interest, without the user first selecting the cursor positioning pad, may be utilized. For instance, referring again to FIG. 8A, when the user enters a next input and the cursor 916 is located as indicated in FIG. 8A, the next input may be analyzed to determine whether the next input should be inserted into the expression 904 in the first area or level 908 or in the area or level 912. In some embodiments, heuristics are utilized to determine in which area or level a next input should be inserted. For example, it may be generally observed that exponents entered by users tend to have only one term. Thus, in some embodiments in which the position of interest is within an area corresponding to an exponent, the next input may be analyzed to determine whether the next input will result in the exponent having multiple terms. For example, referring to FIG. 8A, if the next input is "+", this input would result in the exponent of the expression 904 having multiple terms. Thus, it is assumed that the user intended that the "+" should be entered in the area 912. FIG. 8C illustrates the display 900 after the user has entered "+" and without the user first selecting the cursor positioning pad 920, according to an embodiment. The "+" was inserted in the area 912, and the cursor 916 was moved to the area 912. Additionally, the pad 920 is removed from the display 900.

Figure 8D:
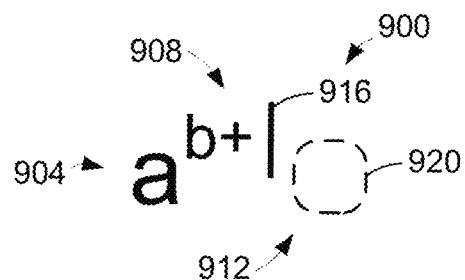

In an embodiment, if the user did not intend for the next input to be inserted in the second area 912, the user may select a "backspace" key, a "delete" key, or another suitable key, pad, etc., to cause the insertion of the next input in the second area 912 to be "undone" and, optionally, insert the next input in the first area 908. For example, FIG. 8D illustrate the display 900 after the user has selected the "backspace" key, the "delete" key, or the other suitable key, pad, etc., as described above, according to an embodiment. The "+" has been moved from the second area 912 to the first area 908. Additionally, the cursor 916 has been moved from the second area 912 to the first area 908. Further, the cursor positioning pad 920 is now displayed in the second area 912.

Figure 9A:
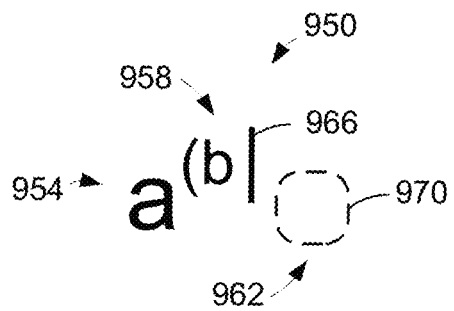
FIGS. 9A-9D are illustrations of an example display that may be shown in a display of a calculator application, according to an embodiment.

FIG. 9A illustrates an example display 950 that may be displayed on a display device by an application such as the calculator application described above. The display 950 includes an input expression 954. The input expression 954 has a first area 958 that corresponds to an exponent of the expression 954, and a second area 962 to the right of the expression and outside of the exponent.

The expression 954 is a structured object having a plurality of levels in a hierarchy. For example, the first area 958 may correspond to a first level, and the second area 962 may correspond to a second level. The second level is above the first level in the hierarchy, in an embodiment.

A current input location is indicated by a cursor 966. As illustrated in FIG. 9A, the current input location is in the first area 958, i.e., in the first level of the hierarchy. A cursor positioning pad 970 is displayed in the second level to the right of the expression 954.

If the current input location, represented by the cursor 966, is within the first area 958 (and in the first level in the hierarchy) and the user desires to move the current input location to within the second level, the user may press the cursor positioning pad 970. In response to this press, the calculator application may determine that the user selected the cursor positioning pad 970 in a manner such as described above. In response, the calculator application recognizes the user input and moves the current input location, represented by the cursor 966, outside of the first area 958 to within the second level in the hierarchy, in the area 962. When the cursor is within the second level of the hierarchy of the structured expression 954, the cursor positioning pad 970 is no longer displayed.

Figure 9B:
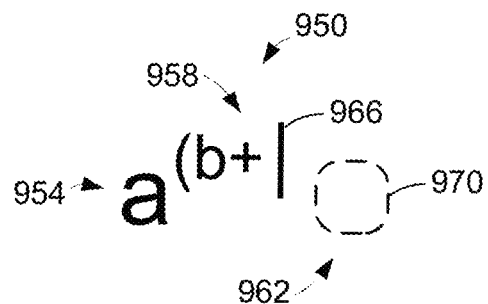

When the user enters a next input and the cursor 966 is located as indicated in FIG. 9A, the next input may be analyzed to determine whether the next input should be inserted into the expression 954 in the first area or level 958 or in the area or level 962. As discussed above, in some embodiments, heuristics are utilized to determine in which area or level a next input should be inserted. Unlike the example discussed with respect to FIGS. 8A, 8C, and 8D, the user began the exponent with a left parenthesis. This may indicate, for the example, that the user may intend for the exponent to be structurally complex, e.g., that the exponent will have multiple terms. Thus, unlike the example discussed with respect to FIGS. 8A, 8C, and 8D, if the next input is "+", it may be assumed that the user intended that the "+" should be entered in the area 958, i.e., as part of the exponent. FIG. 9B illustrates the display 950 after the user has entered "+", according to an embodiment. The "+" was inserted in the area 958, and the cursor 966 remains in the area 958.

Figure 9C:
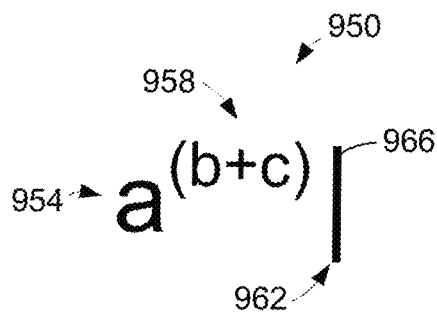

FIG. 9C illustrates the display 950 after the user has entered a right parenthesis within the area 908. This may indicate, for the example, that the user is finished with the exponent of the expression 954. Thus, it may be assumed that the user intends for the next input to be inserted in the area 962. As a result of this assumption, the cursor 966 was moved to the area 962, and the pad 970 is removed from the display 950.

Figure 9D:
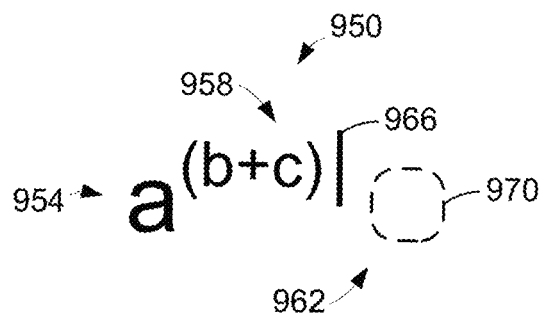

In an embodiment, if the user did not intend for the next input to be inserted in the second area 962, the user may select a "backspace" key, a "delete" key, or another suitable key, pad, etc., to cause the movement of the cursor 966 to the second area 962 to be "undone". For example, FIG. 9D illustrate the display 950 after the user has selected the "backspace" key, the "delete" key, or the other suitable key, pad, etc., as described above, according to an embodiment. The cursor 966 has been moved from the second area 962 to the first area 958, and the cursor positioning pad 970 is now displayed in the second area 962.

In some embodiments, the next input is analyzed to determine if automatic movement of the position of interest to the next level within the structured input expression, without the user first selecting an positioning pad, will likely result in requiring less user input as compared to the user using the positioning pad to move the position of interest to the next level. For example, the automatic movement of the position of interest discussed with respect to FIGS. 8A and 8C would result in the expression 904 as illustrated in FIG. 8C with only one user input, i.e., the user entering "+". On the other hand, the user first pressing the landing pad 920 and then entering "+" would also result in the expression 904 as illustrated in FIG. 8C, but would require two user inputs: pressing the landing pad 920 and then entering "+". Similarly, the automatic movement of the position of interest discussed with respect to FIGS. 9A-9C would result in the expression 954 and cursor position as illustrated in FIG. 9C with only one user input, i.e., the user entering ")". On the other hand, the user entering ")" and then pressing the landing pad 970 would also result in the expression 954 and cursor position as illustrated in FIG. 9C, but would require two user inputs: entering ")" and pressing the landing pad 970. In some embodiments, the next input is analyzed using heuristics configured to determine if automatic movement of the position of interest to the next level within the structured input expression, without the user first selecting an positioning pad, will likely result in requiring less user input as compared to the user using the positioning pad to move the position of interest to the next level.

Figure 10A:
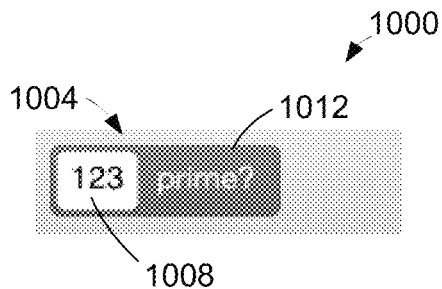
FIGS. 10A-10C are illustrations of an example display that may be in a display of a calculator application, according to an embodiment.
Figure 10B:
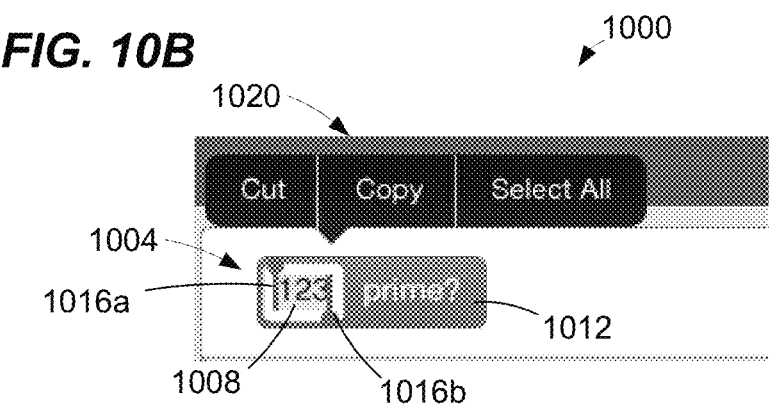
Figure 10C:
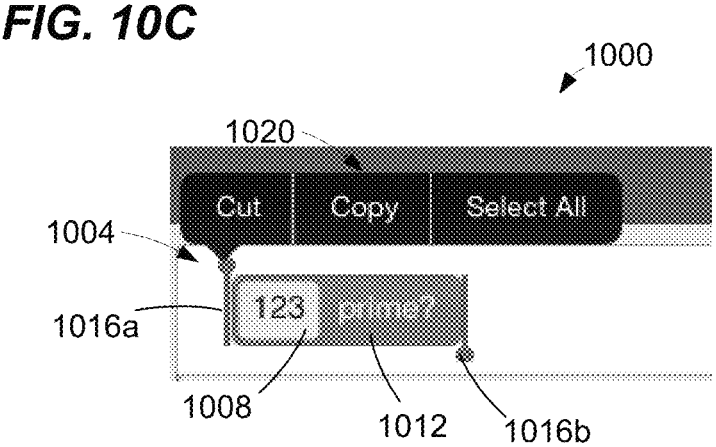

FIGS. 10A-10C illustrate an example display 1000 that may be displayed on a display device by an application such as the calculator application described above. The display 1000 includes an expression 1004. The expression 1004 may be an input expression, for example. In some embodiments, the expression 1004 may be an output expression such as an expression generated by the calculator application in response to an input expression and/or as a result of performing an operation on an input expression, for example. Example techniques for selecting a portion of the expression 1000 or the entire expression 1000 are described with reference to FIGS. 10A-10C. In some embodiments, such selection techniques can be utilized in combination with one or more of the cursor positioning techniques described above. In other embodiments, such selection techniques can be utilized without the cursor positioning techniques described above.

The expression 1004 is a structured object having a plurality of levels in a hierarchy. For example, a first area 1008 may correspond to a first level, and a second area 1012 may correspond to a second level. The second level is above the first level in the hierarchy, in an embodiment.

In various embodiments, which portion of the expression 1004 is to be selected in response to a user input (e.g., a user input indicating a selection-type of input) is determined based on where on the expression 1004 the user input is directed. For example, a calculator application as described above or another suitable application may make the determination. The user input indicating a selection type of input may be any suitable input such as a touchscreen press, a touchscreen press sustained for a suitable amount of time (e.g. 2 seconds), a right mouse key selection while a mouse key is over the expression 1004, etc.

FIG. 10B illustrates the display 100 generated by the application in response to the application detecting a selection-type user input directed to the first area 1008, i.e., in the first level of the hierarchy. For example, a selection-type user input corresponding to a touchscreen press in the first area 1008 may be detected.

The application has selected a portion of the expression corresponding to the first level, while other portions of the expression 1004 are not selected. In particular, because the selection-type user input was directed to the first area 10008 which corresponds to the first level of the hierarchy, and because the first level of the hierarchy is below the second level, a portion of the expression corresponding to the second level and outside of the first level is not selected. The application may indicate the selection of the portion by highlighting the portion, for example, and/or using another suitable technique. In an embodiment, the application may additionally display markers 1016 which indicate the extent of the selection. In an embodiment, a user may be able to change which portion of the expression and/or the extent of the selection by moving one or both of the markers 1016.

In an embodiment, the application displays a user interface 1020 to permit the user to take an action with respect to the selection, such as i) copy the selection to a clipboard, and/or ii) delete the selection from the expression.

FIG. 10C illustrates the display 100 generated by the application in response to the application detecting a selection-type user input directed to the second area 1012, i.e., in the second level of the hierarchy. For example, a selection-type user input corresponding to a touchscreen press in the second area 1012 may be detected.

The application has selected a portion of the expression corresponding to both the second level and the first level. In particular, because the selection-type user input was directed to the second area 1012 which corresponds to the second level of the hierarchy, and because the first level of the hierarchy is below the second level, the portion of the expression corresponding to the first level is also selected. The application may indicate the selection of the portion by highlighting the portion, for example, and/or using another suitable technique. In an embodiment, the application may additionally display markers 1016 which indicate the extent of the selection. In an embodiment, a user may be able to change which portion of the expression and/or the extent of the selection by moving one or both of the markers 1016.

In one embodiment, a method for moving a cursor displayed via a display device of a computing device includes displaying, via the display device, an input field in which an expression can be entered, wherein the input field includes a first area and a second area. The method also includes displaying, via the display device, a cursor within the input field, the cursor indicating a location at which user input will next be entered within the expression. Additionally, the method includes, when the cursor is located within the first area, displaying, via the display device, a first cursor positioning pad associated with the second area, wherein the first cursor positioning pad is configured to enable moving the cursor out of the first area and into the second area. Further, the method includes detecting, with the computing device, activation of the first cursor positioning pad by a user, and in response to detecting activation of the first cursor positioning pad, moving the cursor, displayed via the display device, from the first area to the second area. Still further, the method includes, when the cursor is in the second area, no longer displaying the first cursor positioning pad via the display device.

In another embodiment, a non-transient, tangible, computer readable storage medium or media has stored thereon machine readable instructions that, when executed by a processor of a computing device, cause the processor to implement the method described in the preceding paragraph.

In yet another embodiment, a computing device comprises a display device, a user input device, and one or more processors. One or more memories and/or computer readable storage devices are coupled to the one or more processors. The one or more memories have stored thereon machine readable instructions that, when executed by the one or more processors, cause the one or more processors to implement the method described in the preceding paragraph.

In various other embodiments, the method, computer readable storage medium or media, and/or the computing device may comprise one or more of the following.

The first cursor positioning pad is displayed in the second area.

The first cursor positioning pad is displayed at a location to which the cursor is to be moved in response to detecting activation of the first cursor positioning pad.

The first area corresponds to an area within a first pair of brackets displayed in the input field, and the second area corresponds to an area within a second pair of brackets displayed in the input field.

The first pair of brackets is located within the second pair of brackets and the second area corresponds to an area both (i) within the second pair of brackets and (ii) outside of the first pair of brackets.

After moving the cursor from the first area to the second area, and when the cursor is located outside of the first area, a second cursor positioning pad associated with the first area is displayed, via the display device, wherein the second cursor positioning pad is to enable moving the cursor to within the first area; activation of the second cursor positioning pad is detected with the computing device; in response to detecting activation of the second cursor positioning pad, the cursor, displayed via the display device, is moved into the first area; and, when the cursor is in the first area, the second cursor positioning pad is no longer displayed via the display device.

The second cursor positioning pad is displayed in the first area.

The second cursor positioning pad is displayed at a location to which the cursor is to be moved in response to detecting activation of the second cursor positioning pad.

It is predicted, with the computing device, that a user likely will move the cursor to a location in the second area; wherein displaying the first cursor positioning pad is in response to predicting, with the computing device, that the user likely will move the cursor to the second area.

Predicting that the user likely will move the cursor to the location in the second area is based on a structure of an input expression in the input field.

In another embodiment, a method for facilitating movement of a position of interest displayed via a display device includes: displaying, via the display device, a structured object having a plurality of levels in a hierarchy or corresponding to a multi-dimensional coordinate space; analyzing, with one or more processors, the structured object to determine the plurality of levels, including determining a first level and a second level in the plurality of levels; determining, with one or more processors, which level in the plurality of levels the position of interest is currently located; and when it is determined that the position of interest is currently located in the first level: determining, with the one or more processors, a first next location in the second level of the object based on the determination that a current location of the position of interest is in the first level, the first next location being a prediction of where the user will choose to move the position of interest subsequently from the current location, displaying, via the display device, a first positioning pad corresponding to the first next location, wherein the first positioning pad is to enable moving the position of interest to the first next location, and when activation of the first positioning pad is detected, (i) moving the position of interest from the current location in the first level to the first next location in the second level, and (ii) no longer displaying the first positioning pad via the display device.

In another embodiment, the method further includes: analyzing, with one or more processors, a user input to be inserted in the structured object to determine whether the position of interest should be moved from the current location to the first next location in the second level; and when it is determined that the position of interest should be moved from the current location to the first next location in the second level, (i) moving the position of interest from the current location to the first next location in the second level, and (ii) no longer displaying the first positioning pad via the display device.

In another embodiment, the method further includes, after moving the position of interest from the current location to the first next location in the second level: receiving further user input indicating the position of interest should not have been moved to the first next location in the second level; and moving, with one or more processors, the position of interest from the second level back to the first level.

In another embodiment, a non-transient, tangible, computer readable storage medium or media has stored thereon machine readable instructions that, when executed by a processor of a computing device, cause the processor to implement any of the methods described in the preceding three paragraphs.

In yet another embodiment, a computing device comprises a display device, a user input device, and one or more processors. One or more memories and/or computer readable storage devices are coupled to the one or more processors. The one or more memories have stored thereon machine readable instructions that, when executed by the one or more processors, cause the one or more processors to implement the method described in the preceding four paragraphs.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory, computer readable memory such as a magnetic disk, an optical disk, a RAM, a ROM, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed:

1. A method for facilitating movement of a position of interest displayed via a display device, the method comprising:
    displaying, via the display device, a structured object having a plurality of levels in a hierarchy or corresponding to a multi-dimensional coordinate space;
    analyzing, with one or more processors, the structured object to determine the plurality of levels, including determining a first level and a second level in the plurality of levels;
    determining, with the one or more processors, which level in the plurality of levels a position of interest is currently located; and
    when the position of interest is determined to be currently located in the first level:
        determining, with the one or more processors, a first next location in the second level of the structured object based on the determination that a current location of the position of interest is in the first level, the first next location being a prediction of where a user will choose to move the position of interest subsequently from the current location,
        displaying, via the display device, a first positioning pad corresponding to the first next location, wherein the first positioning pad is to enable moving the position of interest to the first next location, and
        when activation of the first positioning pad is detected, (i) moving the position of interest from the current location in the first level to the first next location in the second level, and (ii) no longer displaying the first positioning pad via the display device.

2. The method of claim 1, wherein:
    analyzing the structured object includes determining a third level in the plurality of levels;
    the method further comprises, when the position of interest is determined to be currently located in the first level:
        determining, with the one or more processors, a second next location in the third level of the structured object based on the determination that the current location of the position of interest is in the first level, the second next location being a further prediction of where the user will choose to move the position of interest subsequently from the current location,
        displaying, via the display device, a second positioning pad corresponding to the second next location, wherein the second positioning pad is to enable moving the position of interest to the second next location, and
        when activation of the second positioning pad is detected, (i) moving the position of interest, displayed via the display device, from the current location in the first level to the second next location in the third level, and (ii) no longer displaying the second positioning pad via the display device.

3. The method of claim 2, wherein:
    the third level is above the second level in the hierarchy; and
    the method further comprises when activation of the second positioning pad is detected, no longer displaying the first positioning pad via the display device.

4. The method of claim 1, wherein the method further comprises, when activation of the first positioning pad is detected:
  determining, with the one or more processors, a set of one or more currently displayed positioning pads, if any, corresponding to one or more levels in the plurality of levels, if any, below the second level in the hierarchy,
  no longer displaying the set of one or more positioning pads via the display device, and
  continuing to display, via the display device, one or more currently displayed positioning pads, if any, corresponding to one or more levels in the plurality of levels, if any, above the second level in the hierarchy.

5. The method of claim 4, wherein the method further comprises, when activation of the first positioning pad is detected:
  continuing to display, via the display device, one or more currently displayed positioning pads, if any, corresponding to one or more levels in the plurality of levels, if any, equivalent with the second level.

6. The method of claim 1, wherein the method further comprises, when activation of the first positioning pad is detected:
  determining, with the one or more processors, a set of one or more currently displayed positioning pads, if any, corresponding to one or more levels in the plurality of levels, if any, above the second level in the hierarchy,
  no longer displaying the set of one or more positioning pads via the display device, and
  continuing to display, via the display device, one or more currently displayed positioning pads, if any, corresponding to one or more levels in the plurality of levels, if any, below the second level in the hierarchy.

7. The method of claim 1, wherein the position of interest is a user input position.

8. The method of claim 7, further comprising displaying, via the display device, a cursor to indicate the user input position.

9. The method of claim 1, wherein the structured object comprises an expression.

10. The method of claim 9, wherein the expression comprises a mathematical expression.

11. The method of claim 10, wherein at least some of the plurality of levels correspond to nested brackets in the mathematical expression.

12. A non-transient, tangible, computer readable storage medium or media having stored thereon machine readable instructions that, when executed by a processor of a computing device, cause the processor to:
  display, via a display device, a structured object having a plurality of levels in a hierarchy or corresponding to a multi-dimensional coordinate space,
  analyze the structured object to determine the plurality of levels, including determining a first level and a second level in the plurality of levels,
  determine which level in the plurality of levels a position of interest is currently located, and
  when the position of interest is determined to be currently located in the first level:
    determine a first next location in the second level of the structured object based on the determination that a current location of the position of interest is in the first level, the first next location being a prediction of where a user will choose to move the position of interest subsequently from the current location,
    display a first positioning pad corresponding to the first next location, wherein the first positioning pad is to enable moving the position of interest to the first next location, and
    when activation of the first positioning pad is detected, (i) move the position of interest from the current location in the first level to the first next location in the second level, and (ii) no longer displaying the first positioning pad via the display device.

13. The non-transient, tangible, computer readable storage medium or media of claim 12, having stored thereon machine readable instructions that, when executed by the processor, cause the processor to:
  analyze the structured object to determine a third level in the plurality of levels;
  when the position of interest is determined to be currently located in the first level:
    determine a second next location in the third level of the structured object based on the determination that the current location of the position of interest is in the first level, the second next location being a further prediction of where the user will choose to move the position of interest subsequently from the current location,
    display a second positioning pad corresponding to the second next location, wherein the second positioning pad is to enable moving the position of interest to the second next location, and
    when activation of the second positioning pad is detected, (i) move the position of interest, displayed via the display device, from the current location in the first level to the second next location in the third level, and (ii) no longer display the second positioning pad via the display device.

14. The non-transient, tangible, computer readable storage medium or media of claim 13, wherein:
  the third level is above the second level in the hierarchy; and
  the non-transient, tangible, computer readable storage medium or media having stored thereon machine readable instructions that, when executed by the processor, cause the processor to, when activation of the second positioning pad is detected, no longer display the first positioning pad via the display device.

15. The non-transient, tangible, computer readable storage medium or media of claim 14, having stored thereon machine readable instructions that, when executed by the processor, cause the processor to, when activation of the first positioning pad is detected:
  determine a set of one or more currently displayed positioning pads, if any, corresponding to one or more levels in the plurality of levels, if any, below the second level in the hierarchy,
  no longer display the set of one or more positioning pads via the display device, and
  continue to display, via the display device, one or more currently displayed positioning pads, if any, corresponding to one or more levels in the plurality of levels, if any, above the second level in the hierarchy.

16. The non-transient, tangible, computer readable storage medium or media of claim 15, having stored thereon machine readable instructions that, when executed by the processor, cause the processor to, when activation of the first positioning pad is detected:
  continue to display, via the display device, one or more currently displayed positioning pads, if any, corresponding to one or more levels in the plurality of levels, if any, equivalent with the second level.

17. The non-transient, tangible, computer readable storage medium or media of claim 14, having stored thereon machine readable instructions that, when executed by the processor, cause the processor to, when activation of the first positioning pad is detected:
  determine a set of one or more currently displayed positioning pads, if any, corresponding to one or more levels in the plurality of levels, if any, above the second level in the hierarchy,
  no longer display the set of one or more positioning pads via the display device, and
  continue to display, via the display device, one or more currently displayed positioning pads, if any, corresponding to one or more levels in the plurality of levels, if any, below the second level in the hierarchy.

18. A computing device, comprising:
  a user input device;
  a processor; and
  a memory, the memory having stored therein machine readable instructions that, when executed by the processor, cause the processor to
    display, via a display device coupled to the processor, a structured object having a plurality of levels in a hierarchy or corresponding to a multi-dimensional coordinate space,
    analyze the structured object to determine the plurality of levels, including determining a first level and a second level in the plurality of levels,
    determine which level in the plurality of levels a position of interest is currently located, and
    when the position of interest is determined to be currently located in the first level:
      determine a first next location in the second level of the structured object based on the determination that a current location of the position of interest is in the first level, the first next location being a prediction of where a user will choose to move the position of interest subsequently from the current location,
      display a first positioning pad corresponding to the first next location, wherein the first positioning pad is to enable moving the position of interest to the first next location, and
      when activation of the first positioning pad is detected, (i) move the position of interest from the current location in the first level to the first next location in the second level, and (ii) no longer displaying the first positioning pad via the display device.

19. The computing device of claim 18, wherein the memory stores machine readable instructions that, when executed by the processor, cause the processor to:
  analyze the structured object to determine a third level in the plurality of levels;
  when the position of interest is determined to be currently located in the first level:
    determine a second next location in the third level of the structured object based on the determination that the current location of the position of interest is in the first level, the second next location being a further prediction of where the user will choose to move the position of interest subsequently from the current location,
    display a second positioning pad corresponding to the second next location, wherein the second positioning pad is to enable moving the position of interest to the second next location, and
    when activation of the second positioning pad is detected, (i) move the position of interest, displayed via the display device, from the current location in the first level to the second next location in the third level, and (ii) no longer display the second positioning pad via the display device.

20. The computing device of claim 19, wherein:
  the third level is above the second level in the hierarchy; and
  the memory stores machine readable instructions that, when executed by the processor, cause the processor to, when activation of the second positioning pad is detected, no longer display the first positioning pad via the display device.

21. The computing device of claim 18, wherein the memory stores machine readable instructions that, when executed by the processor, cause the processor to, when activation of the first positioning pad is detected:
  determine a set of one or more currently displayed positioning pads, if any, corresponding to one or more levels in the plurality of levels, if any, below the second level in the hierarchy,
  no longer display the set of one or more positioning pads via the display device, and
  continue to display, via the display device, one or more currently displayed positioning pads, if any, corresponding to one or more levels in the plurality of levels, if any, above the second level in the hierarchy.

22. The computing device of claim 21, wherein the memory stores machine readable instructions that, when executed by the processor, cause the processor to, when activation of the first positioning pad is detected:
  continue to display, via the display device, one or more currently displayed positioning pads, if any, corresponding to one or more levels in the plurality of levels, if any, equivalent with the second level.

23. The computing device of claim 18, wherein the memory stores machine readable instructions that, when executed by the processor, cause the processor to, when activation of the first positioning pad is detected:
  determine a set of one or more currently displayed positioning pads, if any, corresponding to one or more levels in the plurality of levels, if any, above the second level in the hierarchy,
  no longer display the set of one or more positioning pads via the display device, and
  continue to display, via the display device, one or more currently displayed positioning pads, if any, corresponding to one or more levels in the plurality of levels, if any, below the second level in the hierarchy.

24. The computing device of claim 18, wherein the user input device is a touch screen.

25. The computing device of claim 18, further comprising the display device.

* * * * *